US012806527B2

(12) United States Patent
Terao et al.

(10) Patent No.: US 12,806,527 B2
(45) Date of Patent: Nov. 24, 2026

(54) STORAGE MEDIUM, INFORMATION PROCESSING SYSTEM, INFORMATION PROCESSING APPARATUS AND INFORMATION PROCESSING METHOD

(71) Applicant: Nintendo Co., Ltd., Kyoto (JP)

(72) Inventors: Keiichiro Terao, Kyoto (JP); Eiji Funahashi, Kyoto (JP)

(73) Assignee: NINTENDO CO., LTD., Kyoto (JP)

( * ) Notice: Subject to any disclaimer, the term of this patent is extended or adjusted under 35 U.S.C. 154(b) by 107 days.

(21) Appl. No.: 19/040,268

(22) Filed: Jan. 29, 2025

(65) Prior Publication Data

US 2025/0242256 A1 Jul. 31, 2025

(30) Foreign Application Priority Data

Jan. 30, 2024 (JP) ................................ 2024-011593

(51) Int. Cl.
*A63F 13/577* (2014.01)
*A63F 13/52* (2014.01)
(Continued)

(52) U.S. Cl.
CPC ............ *A63F 13/577* (2014.09); *A63F 13/52* (2014.09); *A63F 13/56* (2014.09); *G06T 13/40* (2013.01); *G06T 17/20* (2013.01)

(58) Field of Classification Search
CPC ........ A63F 13/577; A63F 13/52; A63F 13/56; G06T 13/40; G06T 17/20
See application file for complete search history.

(56) References Cited

U.S. PATENT DOCUMENTS 8,581,901 B2 * 11/2013 Joshi ....................... G06T 19/20 382/285
8,771,072 B2 * 7/2014 Dohta ..................... A63F 13/56 463/31
(Continued)

FOREIGN PATENT DOCUMENTS

JP 2001-006000 1/2001
JP 2004-062666 2/2004
(Continued)

OTHER PUBLICATIONS

Voxel Tools: a C++ module for creating volumetric worlds in the Godot Engine, Zylann, Sep. 2023, https://voxel-tools.readthedocs.io/ (retrieved from wayback machine), pp. 1-99.
(Continued)

*Primary Examiner* — Malina D. Blaise
(74) *Attorney, Agent, or Firm* — Nixon & Vanderhye PC

(57) ABSTRACT

An example of an information processing system generates a mesh for a character object in a virtual space based on voxel data related to the character object. An action of the character object is controlled using motion data. When an event occurs for the character object, the voxel data related to the character object is updated. When the voxel data is updated, the information processing system generates the mesh for the character object based on the updated voxel data. When the event occurs, the information processing system controls an action of the character object using the motion data with a tilt of at least a portion of the character object with respect to the virtual space being changed.

19 Claims, 28 Drawing Sheets

(51) Int. Cl.

| | |
|---|---|
| ***A63F 13/56*** | (2014.01) |
| ***G06T 13/40*** | (2011.01) |
| ***G06T 17/20*** | (2006.01) |

(56) References Cited

U.S. PATENT DOCUMENTS

| | | | | |
|---|---|---|---|---|
| 10,553,037 | B2 * | 2/2020 | Snyder | G06T 15/04 |
| 11,557,104 | B2 * | 1/2023 | Snyder | G06T 7/74 |
| 11,741,652 | B1 * | 8/2023 | Krol | G06T 19/20 345/473 |
| 12,437,489 | B2 * | 10/2025 | Zhang | G02B 27/017 |
| 2004/0023717 | A1 | 2/2004 | Tsuda et al. | |
| 2010/0190556 | A1 | 7/2010 | Chan | |
| 2010/0331090 | A1 * | 12/2010 | Dohta | A63F 13/42 463/43 |
| 2012/0315997 | A1 | 12/2012 | Deal et al. | |
| 2017/0193677 | A1 * | 7/2017 | Kim | G06T 12/00 |
| 2019/0311547 | A1 * | 10/2019 | Ohmori | B33Y 50/00 |
| 2021/0283502 | A1 | 9/2021 | Shen | |
| 2021/0357555 | A1 * | 11/2021 | Liu | B33Y 50/00 |
| 2022/0124283 | A1 * | 4/2022 | Krol | G06Q 30/0277 |
| 2024/0082721 | A1 * | 3/2024 | Sato | A63F 13/56 |
| 2024/0264444 | A1 * | 8/2024 | Crai | G02B 27/0172 |
| 2024/0314280 | A1 * | 9/2024 | Uemura | H04N 13/117 |
| 2025/0029346 | A1 * | 1/2025 | Vircíková | G06T 9/001 |
| 2025/0209679 | A1 * | 6/2025 | Shimakawa | H04N 23/63 |
| 2025/0242245 | A1 * | 7/2025 | Mori | A63F 13/5258 |
| 2025/0242248 | A1 * | 7/2025 | Kurihara | A63F 13/55 |
| 2025/0242249 | A1 * | 7/2025 | Kitazono | A63F 13/55 |
| 2025/0242252 | A1 * | 7/2025 | Ueno | A63F 13/57 |
| 2025/0242253 | A1 * | 7/2025 | Ueno | A63F 13/57 |
| 2025/0242254 | A1 * | 7/2025 | Kurihara | A63F 13/57 |
| 2025/0242258 | A1 * | 7/2025 | Kitazono | A63F 13/58 |
| 2025/0242262 | A1 * | 7/2025 | Tanaka | A63F 13/69 |
| 2025/0242263 | A1 * | 7/2025 | Kurihara | A63F 13/69 |
| 2025/0245925 | A1 * | 7/2025 | Tanaka | G06T 13/20 |
| 2025/0245928 | A1 * | 7/2025 | Kubo | A63F 13/52 |
| 2026/0183666 | A1 * | 7/2026 | Kitazono | A63F 13/577 |

FOREIGN PATENT DOCUMENTS

| | | |
|---|---|---|
| JP | 2008-033521 | 2/2008 |
| JP | 2010170505 A | 8/2010 |
| JP | 2013-000226 | 1/2013 |
| JP | 2022-508162 | 1/2022 |

OTHER PUBLICATIONS

Tao Ju, et al., "Dual contouring of hermite data", ACM Transactions on Graphics, Proceedings of ACM SIGGRAPH 2002, vol. 21, No. 3, Jul. 2002, pp. 339-346 (8 pages).

William E. Lorensen, et al., "Marching cubes: A high resolution 3D surface construction algorithm", Computer Graphics, vol. 21, No. 4, Jul. 1987, pp. 347-353 (7 pages).

"Ask the Developer—Donkey Kong Bananza", Parts 1-3—News, Nintendo Official Site, <https://www.nintendo.com/us/whatsnew/ask-the-developer-vol-19-donkey kong-bananza-part-2/>, vol. 19, 31 pages, Jul. 15, 2025, including pp. 11-18.

* cited by examiner

Fig.12

PROPERTY INFORMATION

| ID | PROPERTY | | |
|---|---|---|---|
| | WEIGHT | SLIPPERINESS | ... |
| 001 | 50 | SLIP | ... |
| 002 | 80 | NO SLIP | ... |
| 003 | 70 | NO SLIP | ... |
| ⋮ | ⋮ | ⋮ | ⋮ |

Fig.13

| TEXTURE INFORMATION | |
|---|---|
| ID | TEXTURE |
| 001 | TEXTURE OF SAND |
| 002 | TEXTURE OF ROCK |
| 003 | TEXTURE OF SOIL |
| ⋮ | ⋮ |

STORAGE MEDIUM, INFORMATION PROCESSING SYSTEM, INFORMATION PROCESSING APPARATUS AND INFORMATION PROCESSING METHOD

CROSS REFERENCE TO RELATED APPLICATION

This application claims priority to Japanese Patent Application No. 2024-011593, filed on Jan. 30, 2024, the entire contents of which are incorporated herein by reference.

FIELD

The present disclosure relates to a storage medium, an information processing system, an information processing apparatus and an information processing method for controlling actions of an object that is generated using voxel data.

BACKGROUND AND SUMMARY

Where a portion of an object arranged in a virtual space has been separated, there is a conventional technique to control the action of the object using different motion data depending on the separated state.

With this technique, motion data is prepared for each of the separated states of the object, which may result in a large amount of motion data to be prepared.

Therefore, this application discloses a storage medium, an information processing system, an information processing apparatus and an information processing method that can make objects perform natural actions with a small amount of motion data.

(1)

An example of one or more non-transitory computer-readable storage medium having stored therein instructions that, when executed, cause one or more processors of an information processing apparatus to execute information processing comprising: generating a mesh for a character object in a virtual space based on voxel data related to the character object; controlling an action of the character object using first motion data; updating the voxel data related to the character object when an event occurs for the character object; and generating an image of the virtual space including an image in which the mesh for the character object is rendered so as to output the generated image to a display device. When the voxel data is updated, the mesh for the character object is generated based on the updated voxel data. When the event occurs, an action of the character object is controlled using the first motion data with a tilt of at least a portion of the character object with respect to the virtual space being changed.

With configuration (1) above, as the action of the character object is controlled with the tilt of the character object changed, it is possible to have the character object perform natural actions. By using the same motion data for when the tilt is changed and for when the tilt is not changed, it is possible to reduce the amount of data of the motion data. Thus, with configuration (1) above, it is possible to have a character object perform natural actions with less motion data.

(2)

The storage medium may store instructions for causing the information processing apparatus to perform operations further comprising: when the voxel data is updated, calculating, based on the updated voxel data, the center of gravity for a portion of the character object, the portion at least including a portion generated by the voxel data. A direction in which the tilt of the at least a portion of the character object is changed may be determined based on change in the center of gravity before and after the occurrence of the event.

With configuration (2) above, it is possible to have the character object perform an action with a natural tilt determined based on the change in the center of gravity.

(3)

Where a reference axis is defined as a straight line that passes through the at least a portion of the character object and is parallel to a gravity direction in the virtual space, when the event occurs, the tilt of the character object may change so as to rotate the at least a portion of the character object about a reference position, which is set in the character object, in such a direction that a portion on a side where the center of gravity for the character object exists after the voxel data is updated with respect to the reference axis comes closer to a gravity direction side.

With configuration (3) above, it is possible to cause the character object to take a natural tilt.

(4)

Where a reference axis is defined as a straight line that passes through the at least a portion of the character object and is parallel to a gravity direction in the virtual space, when the event occurs, the tilt of the character object may change so as to rotate the at least a portion of the character object about a reference position, which is set in the character object, in such a direction that the center of gravity for the character object after the voxel data is updated comes closer to the reference axis.

With configuration (4) above, it is possible to cause the character object to take a natural tilt.

(5)

The reference axis may be a straight line that passes through a position different from the reference position and is parallel to a gravity direction in the virtual space.

With configuration (5) above, even if the reference axis passes through a biased position of the character object, the reference position can be set so that the tilting action of the character object will be natural.

(6)

The reference axis may be a straight line that passes through the center of gravity for the character object before the voxel data is updated and is parallel to the gravity direction in the virtual space.

With configuration (6) above, the tilting action of the character object can be made natural.

(7)

The character object may include a portion that is associated with a bone that is set in the character object. An action by the character object may be performed by moving the bone according to the first motion data.

With configuration (7) above, by using bones and motion data, it is possible to allow the character object to freely perform actions.

(8)

The character object may include a first portion whose shape is defined based on the voxel data, and a second portion that is different from the first portion and is associated with the bone. When the event occurs, a tilt of the first portion and a portion of the second portion may change as the at least a portion of the character object.

With configuration (8) above, the posture of the character object being tilted can be made more natural.

(9)

The reference position may be a position of a pelvic joint of the character object among all joints that connect together bones.

With configuration (9) above, the tilting action of the character object can be made natural.

(10)

The first motion data may represent a walking action of the character object.

With configuration (10) above, it is possible to have the character object perform a natural walking action.

(11)

An upper limit may be set for an angle by which the character object is tilted.

With configuration (11) above, it is possible to reduce the possibility that an action of the character object may be unnatural due to the tilt being too large.

(12)

When the event occurs, the voxel data may be updated so as to reduce a volume of the character object.

With configuration (12) above, it is possible to have the character object perform actions so that the tilt is natural when the volume of the character object is reduced.

(13)

When the event occurs, the voxel data may be updated so as to increase a volume of the character object.

With configuration (13) above, it is possible to have the character object perform actions so that the tilt is natural when the volume of the character object is increased.

(14)

An action of the character object may be further controlled using second motion data, which is different from the first motion data. When the event occurs, the tilt of the character object when controlling an action of the character object using the first motion data may be different from the tilt of the character object when controlling an action of the character object using the second motion data.

With configuration (14) above, it is possible to reduce the possibility that unnatural actions are performed due to the character object being tilted for certain actions.

(15)

When the event occurs, an action of the character object may be controlled using the second motion data wherein the tilt of the character object is set to the same tilt as that before the occurrence of the event.

With configuration (15) above, it is possible to reduce the possibility that unnatural attacking actions are performed due to the character object being tilted.

(16)

The character object may be an enemy character object and include a core inside a voxel object portion whose shape is defined based on the voxel data. The event may be an event in which the enemy character object is attacked. The storage medium may store instructions for causing the information processing apparatus to perform operations further comprising, when the core is attacked, eliminating entirety of the enemy character object.

With configuration (16) above, it is possible to involve strategic aspects in attacking enemy character objects and to improve the playability of the game.

Note that the present specification discloses an example of an information processing apparatus (e.g., a terminal device or a server) and an information processing system including all or some of the various units recited in (1) to (16) above. The present specification also discloses an example of an information processing method (specifically, the game process method) by which the information processing system executes the various processes recited in (1) to (16) above.

With the storage medium, the information processing system, the information processing apparatus and the information processing method set forth above, it is possible to make objects perform natural actions with a small amount of motion data.

These and other features, aspects and advantages of the subject matter described herein will become more apparent from the following detailed description of the present invention when taken in conjunction with the accompanying drawings.

BRIEF DESCRIPTION OF THE DRAWINGS

FIG. 12 is a diagram showing an example of property information representing properties of materials;

FIG. 13 is a diagram showing an example of texture information representing textures of materials;

DETAILED DESCRIPTION OF NON-LIMITING EXAMPLE EMBODIMENTS

1. Configuration of Game System

A game system according to an example of an exemplary embodiment is described below. An example of a game system 1 according to the exemplary embodiment includes a main body apparatus (an information processing apparatus; which functions as a game apparatus main body in the exemplary embodiment) 2, a left controller 3, and a right controller 4. Each of the left controller 3 and the right controller 4 is attachable to and detachable from the main body apparatus 2. That is, the game system 1 can be used as a unified apparatus obtained by attaching each of the left controller 3 and the right controller 4 to the main body apparatus 2. Further, in the game system 1, the main body apparatus 2, the left controller 3, and the right controller 4 can also be used as separate bodies (see FIG. 2). Hereinafter, first, the hardware configuration of the game system 1 according to the exemplary embodiment is described, and then, the control of the game system 1 according to the exemplary embodiment is described.

Figure 1:
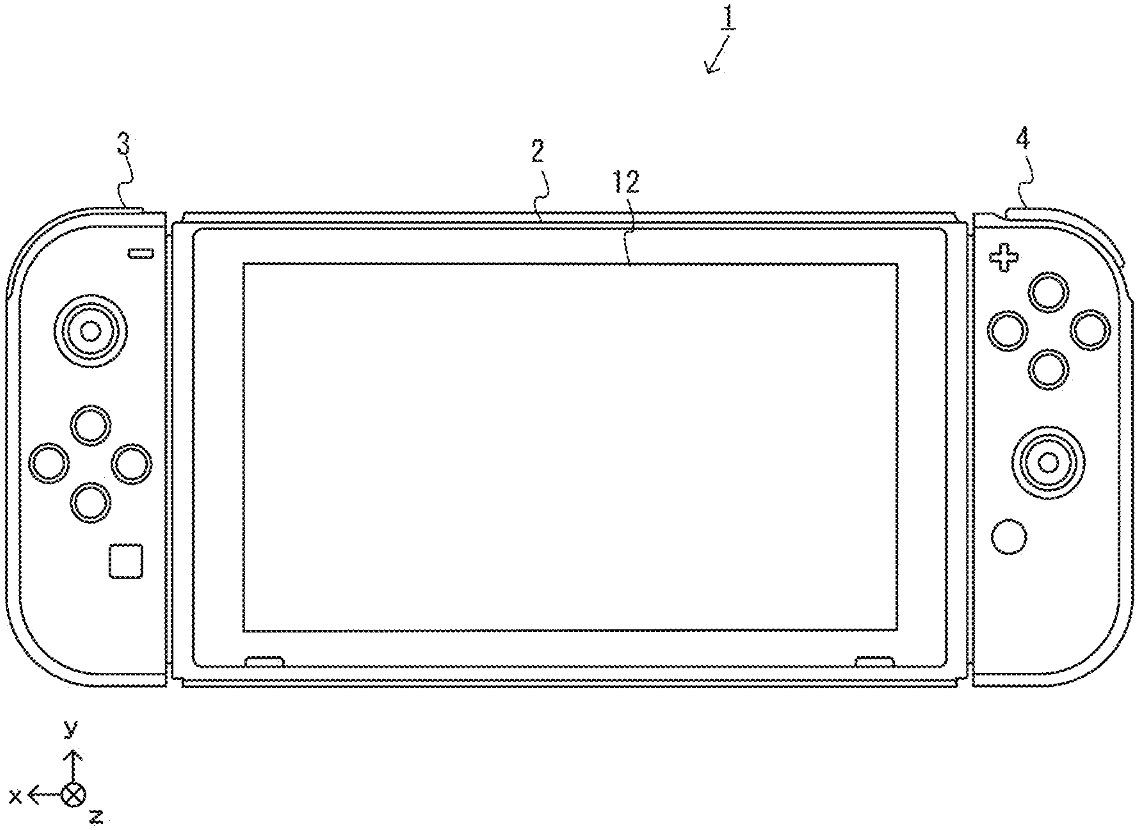
FIG. 1 is a view showing an example where a non-limiting left controller and a non-limiting right controller are attached to a non-limiting main body apparatus.

FIG. 1 is a diagram showing an example of the state where the left controller 3 and the right controller 4 are attached to the main body apparatus 2. As shown in FIG. 1, each of the left controller 3 and the right controller 4 is attached to and unified with the main body apparatus 2. The main body apparatus 2 is an apparatus for performing various processes (e.g., game processing) in the game system 1. The main body apparatus 2 includes a display 12. Each of the left controller 3 and the right controller 4 is an apparatus including operation sections with which a user provides inputs.

Figure 2:
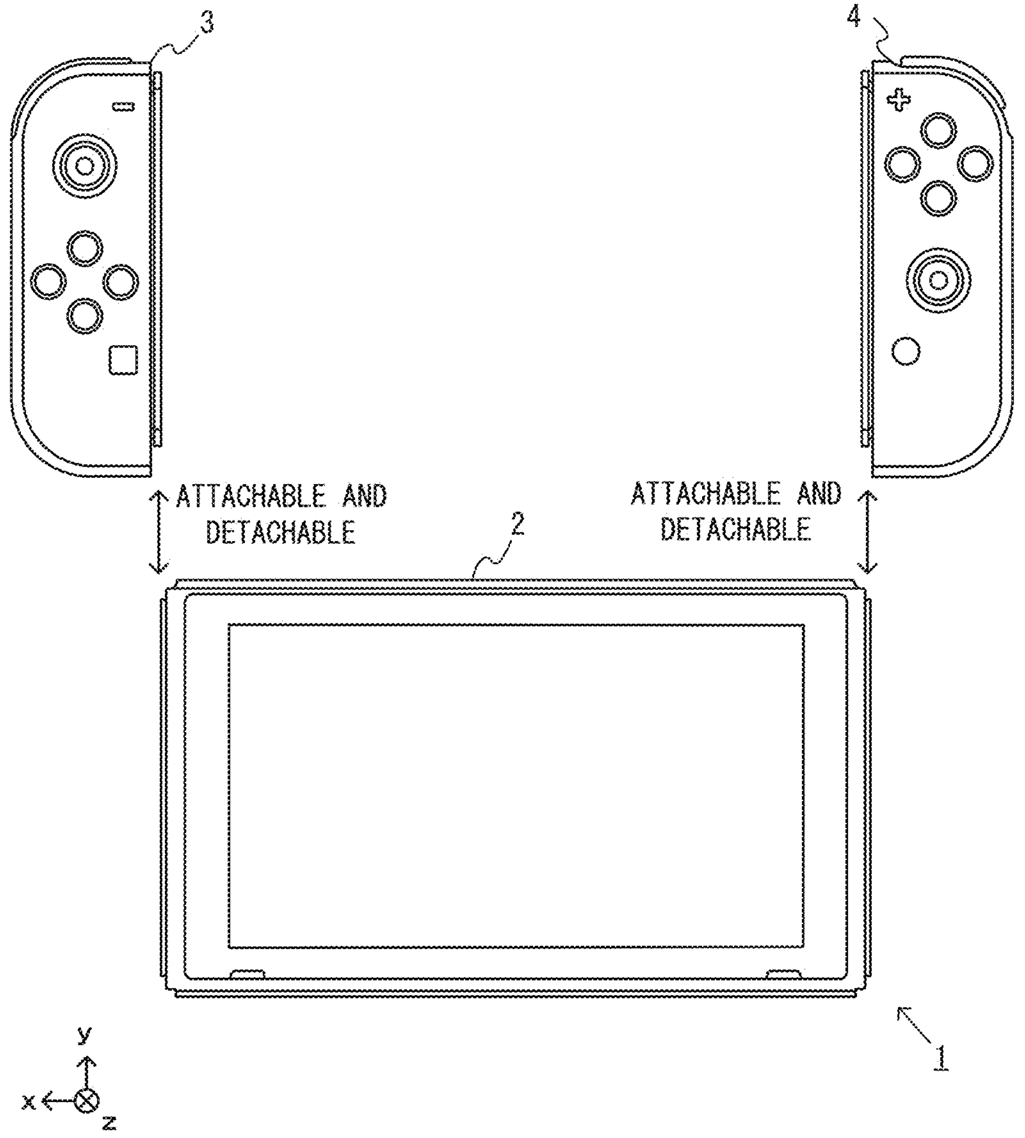
FIG. 2 is a view showing an example where a non-limiting left controller and a non-limiting right controller are removed from a non-limiting main body apparatus.

FIG. 2 is a diagram showing an example of the state where each of the left controller 3 and the right controller 4 is detached from the main body apparatus 2. As shown in FIGS. 1 and 2, the left controller 3 and the right controller 4 are attachable to and detachable from the main body apparatus 2. It should be noted that hereinafter, the left controller 3 and the right controller 4 will occasionally be referred to collectively as a "controller".

Figure 3:
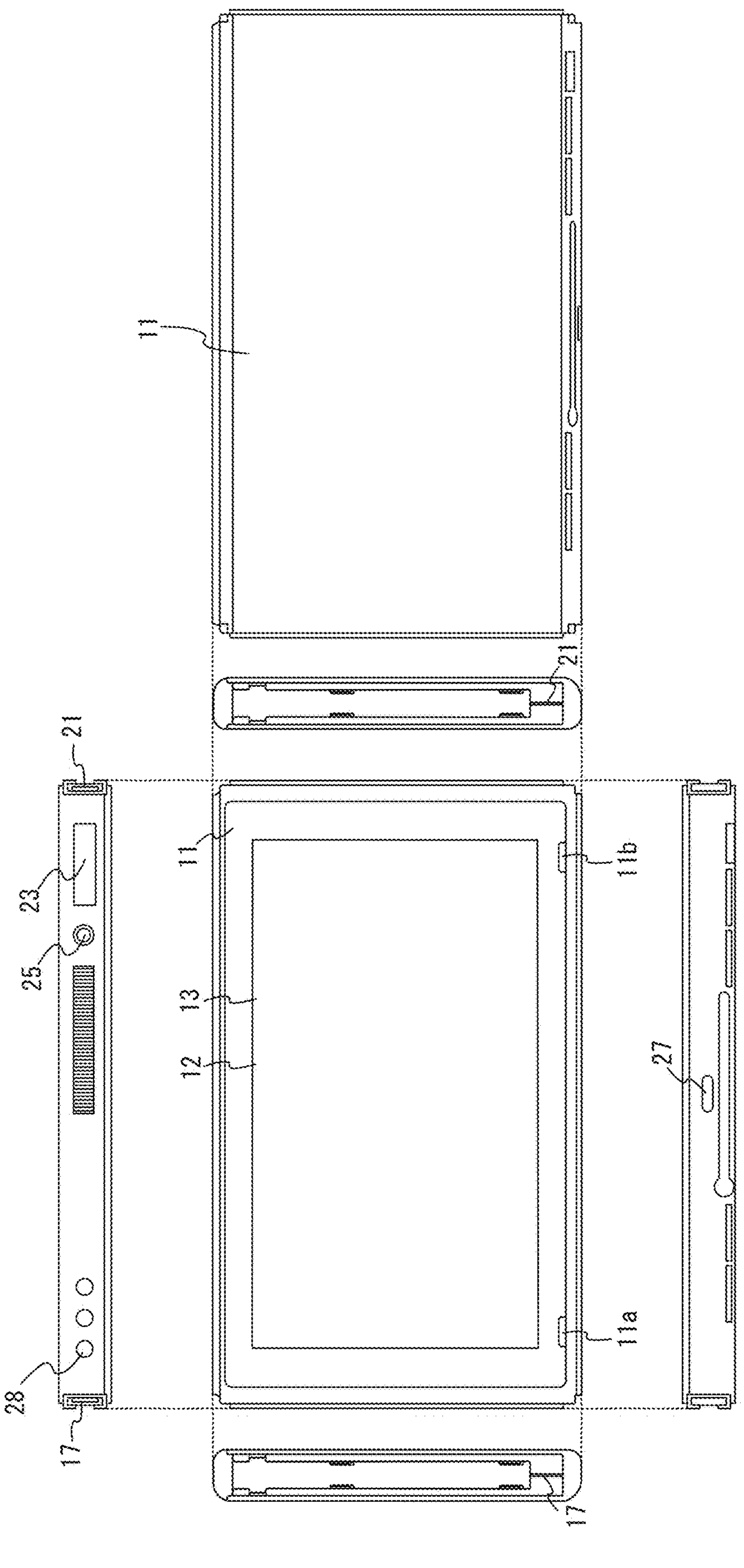
FIG. 3 is a six-sided view showing an example of a non-limiting main body apparatus.

FIG. 3 is six orthogonal views showing an example of the main body apparatus 2. As shown in FIG. 3, the main body apparatus 2 includes an approximately plate-shaped housing 11. In the exemplary embodiment, a main surface (for example, a surface on a front side, such as a surface on which the display 12 is provided) of the housing 11 has a generally rectangular shape.

It should be noted that the shape and the size of the housing 11 are optional. As an example, the housing 11 may be of a portable size. Further, the main body apparatus 2 alone or the unified apparatus obtained by attaching the left controller 3 and the right controller 4 to the main body apparatus 2 may function as a mobile apparatus. The main body apparatus 2 or the unified apparatus may function as a handheld apparatus or a portable apparatus.

As shown in FIG. 3, the main body apparatus 2 includes the display 12, which is provided on the main surface of the housing 11. The display 12 displays an image generated by the main body apparatus 2. In the exemplary embodiment, the display 12 is a liquid crystal display device (LCD). The display 12, however, may be a display device of any type.

Further, the main body apparatus 2 includes a touch panel 13 on a screen of the display 12. In the exemplary embodiment, the touch panel 13 is of a type that allows a multi-touch input (e.g., a capacitive type). The touch panel 13, however, may be of any type. For example, the touch panel 13 may be of a type that allows a single-touch input (e.g., a resistive type).

The main body apparatus 2 includes speakers (e.g., speakers 88 shown in FIG. 6) within the housing 11. As shown in FIG. 3, speaker holes 11*a* and 11*b* are formed on the main surface of the housing 11. Then, sounds output from the speakers 88 are output through the speaker holes 11*a* and 11*b*.

Further, the main body apparatus 2 includes a left terminal 17, which is a terminal for the main body apparatus 2 to perform wired communication with the left controller 3, and a right terminal 21, which is a terminal for the main body apparatus 2 to perform wired communication with the right controller 4.

As shown in FIG. 3, the main body apparatus 2 includes a slot 23. The slot 23 is provided on an upper side surface of the housing 11. The slot 23 is so shaped as to allow a predetermined type of storage medium to be attached to the slot 23. The predetermined type of storage medium is, for example, a dedicated storage medium (e.g., a dedicated memory card) for the game system 1 and an information processing apparatus of the same type as the game system 1. The predetermined type of storage medium is used to store, for example, data (e.g., saved data of an application or the like) used by the main body apparatus 2 and/or a program (e.g., a program for an application or the like) executed by the main body apparatus 2. Further, the main body apparatus 2 includes a power button 28.

The main body apparatus 2 includes a lower terminal 27. The lower terminal 27 is a terminal for the main body apparatus 2 to communicate with a cradle. In the exemplary embodiment, the lower terminal 27 is a USB connector (more specifically, a female connector). Further, when the unified apparatus or the main body apparatus 2 alone is mounted on the cradle, the game system 1 can display on a monitor an image generated by and output from the main body apparatus 2. The monitor may be stationary or may be movable. Further, in the exemplary embodiment, the cradle has the function of charging the unified apparatus or the main body apparatus 2 alone mounted on the cradle. Further, the cradle has the function of a hub device (specifically, a USB hub).

Figure 4:
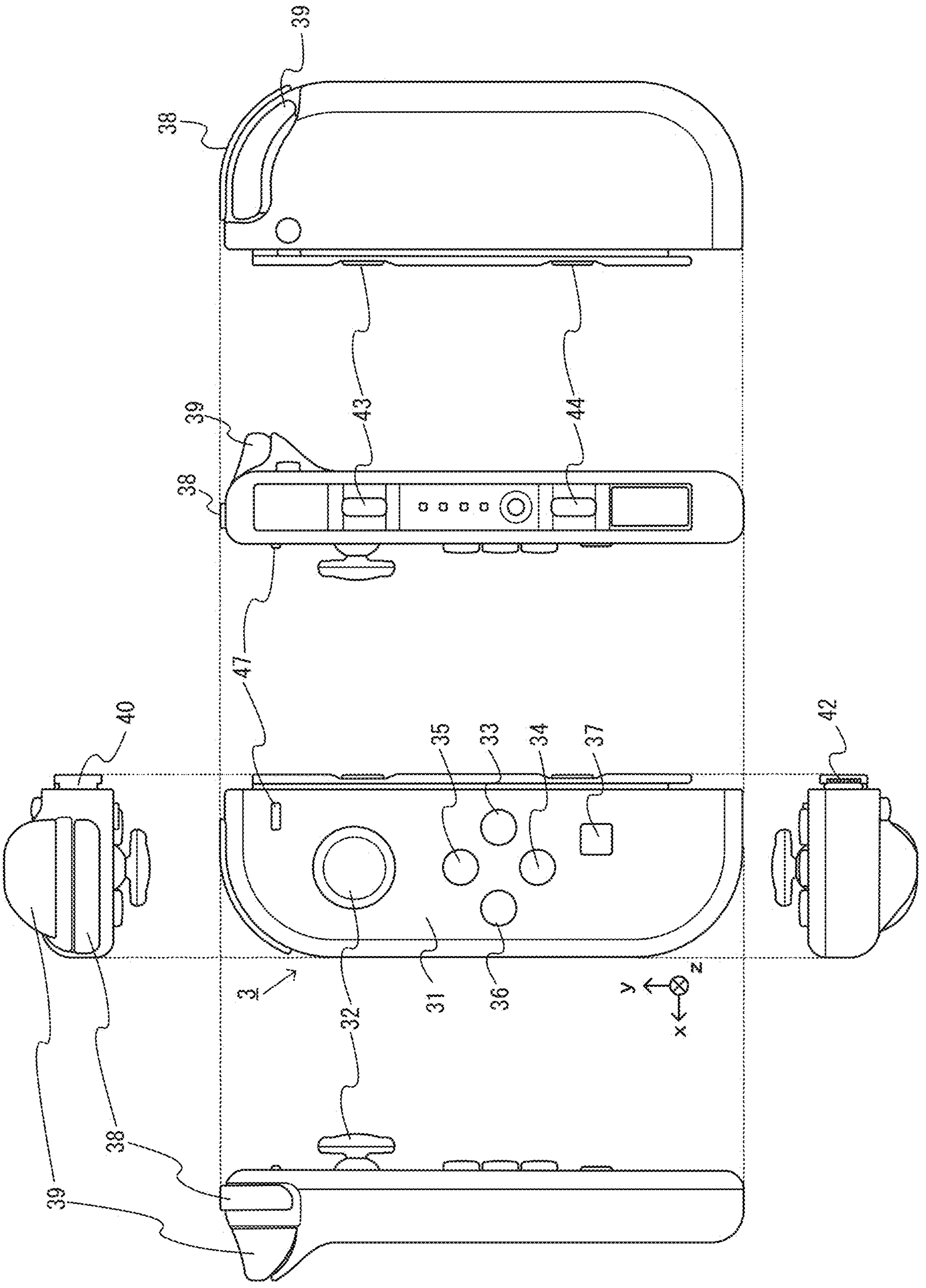
FIG. 4 is a six-sided view showing an example of a non-limiting left controller.

FIG. 4 is six orthogonal views showing an example of the left controller 3. As shown in FIG. 4, the left controller 3 includes a housing 31. In the exemplary embodiment, the housing 31 has a vertically long shape. The housing 31 may be shaped to be long in an up-down direction. For example, along the y-axis direction shown in FIGS. 1 and 4. In the state where the left controller 3 is detached from the main body apparatus 2, the left controller 3 can also be held in the orientation in which the left controller 3 is vertically long. The housing 31 has such a shape and a size that when held in the orientation in which the housing 31 is vertically long, the housing 31 can be held with one hand, particularly the left hand. Further, the left controller 3 can also be held in the orientation in which the left controller 3 is horizontally long. When held in the orientation in which the left controller 3 is horizontally long, the left controller 3 may be held with both hands.

The left controller 3 includes an analog stick 32. As shown in FIG. 4, the analog stick 32 is provided on a main surface of the housing 31. The analog stick 32 can be used as a direction input section with which a direction can be input. The user tilts the analog stick 32 and thereby can input a direction corresponding to the direction of the tilt (and input a magnitude corresponding to the angle of the tilt). It should be noted that the left controller 3 may include a directional pad, a slide stick that allows a slide input, or the like as the direction input section, instead of the analog stick. Further, in the exemplary embodiment, it is possible to provide an input by pressing the analog stick 32.

The left controller 3 includes various operation buttons. The left controller 3 includes four operation buttons 33 to 36 (specifically, a right direction button 33, a down direction button 34, an up direction button 35, and a left direction button 36) on the main surface of the housing 31. Further, the left controller 3 includes a record button 37 and a "–" (minus) button 47. The left controller 3 includes a first L-button 38 and a ZL-button 39 in an upper left portion of a side surface of the housing 31. Further, the left controller 3 includes a second L-button 43 and a second R-button 44, on the side surface of the housing 31 on which the left controller 3 is attached to the main body apparatus 2. These operation buttons are used to give instructions depending on various programs (e.g., an operating system (OS) program and an application program) executed by the main body apparatus 2.

Further, the left controller 3 includes a terminal 42 for the left controller 3 to perform wired communication with the main body apparatus 2.

Figure 5:
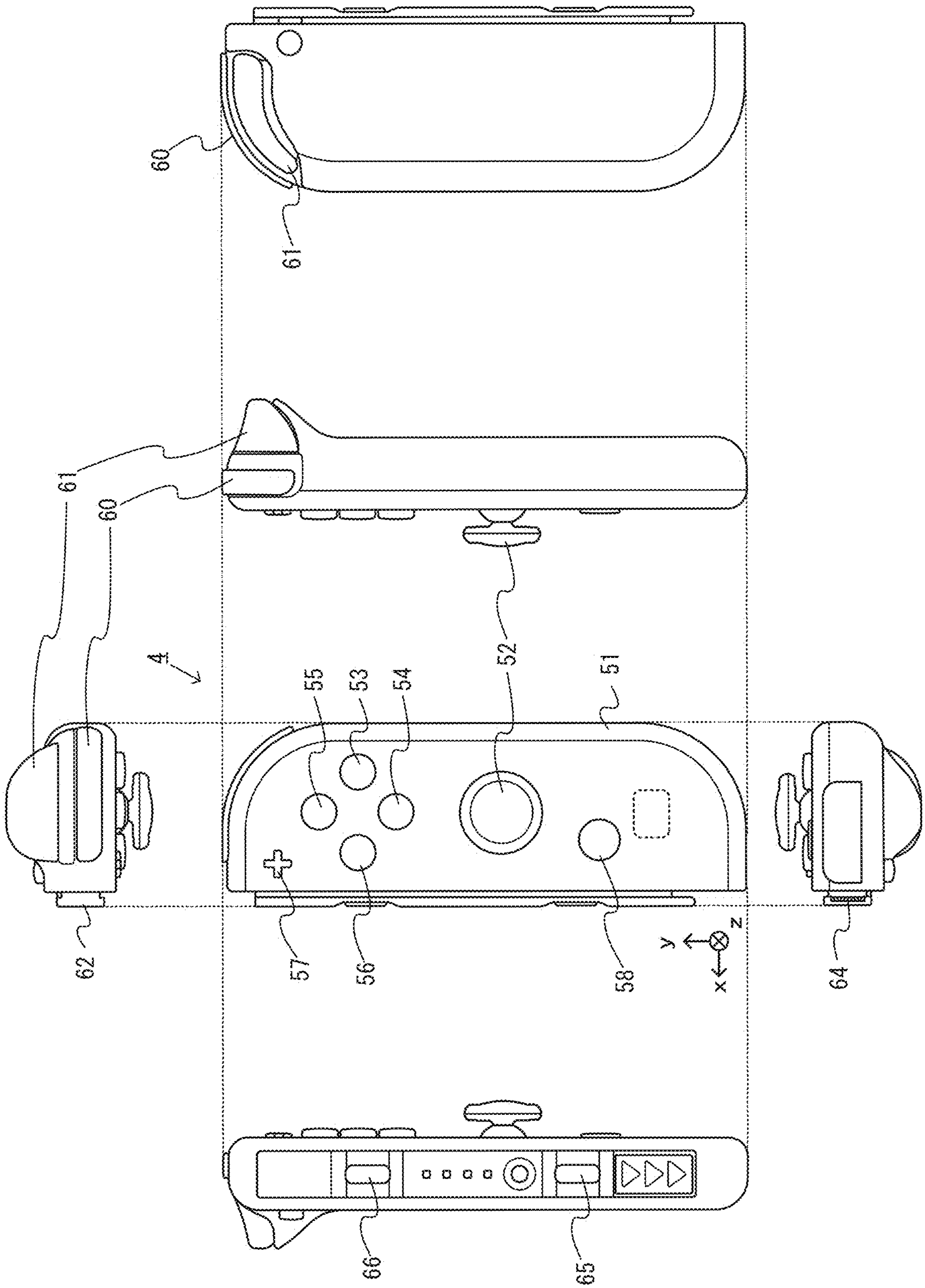
FIG. 5 is a six-sided view showing an example of a non-limiting right controller.

FIG. 5 is six orthogonal views showing an example of the right controller 4. As shown in FIG. 5, the right controller 4 includes a housing 51. In the exemplary embodiment, the housing 51 has a vertically long shape. For example, it may be shaped to be long in the up-down direction. In the state where the right controller 4 is detached from the main body apparatus 2, the right controller 4 can also be held in the orientation in which the right controller 4 is vertically long. The housing 51 has such a shape and a size that when held in the orientation in which the housing 51 is vertically long, the housing 51 can be held with one hand, particularly the right hand. Further, the right controller 4 can also be held in the orientation in which the right controller 4 is horizontally long. When held in the orientation in which the right controller 4 is horizontally long, the right controller 4 may be held with both hands.

Similarly to the left controller 3, the right controller 4 includes an analog stick 52 as a direction input section. In the exemplary embodiment, the analog stick 52 has the same configuration as that of the analog stick 32 of the left controller 3. Further, the right controller 4 may include a directional pad, a slide stick that allows a slide input, or the like, instead of the analog stick. Further, similarly to the left controller 3, the right controller 4 includes four operation buttons 53 to 56 (specifically, an A-button 53, a B-button 54, an X-button 55, and a Y-button 56) on a main surface of the housing 51. Further, the right controller 4 includes a "+" (plus) button 57 and a home button 58. Further, the right controller 4 includes a first R-button 60 and a ZR-button 61 in an upper right portion of a side surface of the housing 51. Further, similarly to the left controller 3, the right controller 4 includes a second L-button 65 and a second R-button 66.

Further, the right controller 4 includes a terminal 64 for the right controller 4 to perform wired communication with the main body apparatus 2.

Figure 6:
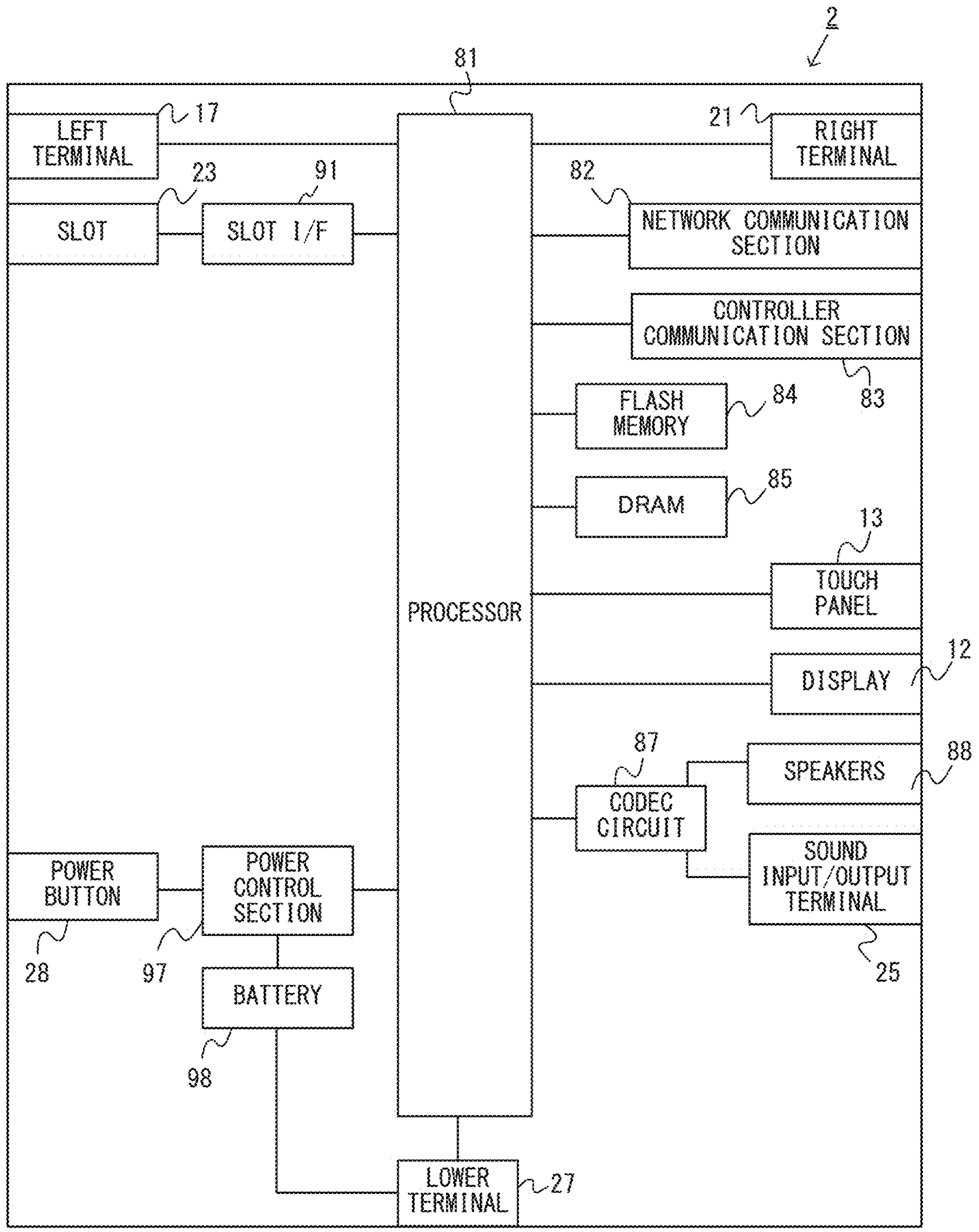
FIG. 6 is a block diagram showing an example of an internal configuration of a non-limiting main body apparatus.

FIG. 6 is a block diagram showing an example of the internal configuration of the main body apparatus 2. The main body apparatus 2 includes components 81 to 85, 87, 88, 91, 97, and 98 shown in FIG. 6 in addition to the components shown in FIG. 3. Some of the components 81 to 85, 87, 88, 91, 97, and 98 may be mounted as electronic components on an electronic circuit board and accommodated in the housing 11.

The main body apparatus 2 includes a processor 81. The processor 81 is an information processing section for executing various types of information processing to be executed by the main body apparatus 2. For example, the processor 81 may be composed only of a CPU (Central Processing Unit), or may be composed of a SoC (System-on-a-chip) having a plurality of functions such as a CPU function and a GPU (Graphics Processing Unit) function. The processor 81 executes an information processing program (e.g., a game program) or other instructions that are stored in storage. For example, in an internal non-transitory storage medium such as a flash memory 84, an external non-transitory storage medium attached to the slot 23, or the like), thereby performing the various types of information processing.

The main body apparatus 2 includes a flash memory 84 and a DRAM (Dynamic Random Access Memory) 85 as examples of internal storage media built into the main body apparatus 2. The flash memory 84 and the DRAM 85 are connected to the processor 81. The flash memory 84 is a memory mainly used to store various data (or programs) to be saved in the main body apparatus 2. The DRAM 85 is a memory used to temporarily store various data used for information processing. The DRAM 85 and flash memory 84 are illustrative non-limiting examples of non-transitory computer-readable media.

The main body apparatus 2 includes a slot interface (hereinafter abbreviated as "I/F") 91. The slot I/F 91 is connected to the processor 81. The slot I/F 91 is connected to the slot 23, and in accordance with an instruction from the processor 81, reads and writes data from and to the predetermined type of storage medium (e.g., a dedicated memory card) attached to the slot 23.

The processor 81 appropriately reads and writes data from and to the flash memory 84, the DRAM 85, and each of the above storage media, thereby performing the above information processing.

The main body apparatus 2 includes a network communication section 82. The network communication section 82 is connected to the processor 81. The network communication section 82 communicates (specifically, through wireless communication) with an external apparatus via a network. In the exemplary embodiment, as a first communication form, the network communication section 82 connects to a wireless LAN and communicates with an external apparatus, using a method compliant with the Wi-Fi standard. Further, as a second communication form, the network communication section 82 wirelessly communicates with another main body apparatus 2 of the same type, using a predetermined communication method (e.g., communication based on a unique protocol or infrared light communication). It should be noted that the wireless communication in the above second communication form achieves the function of enabling so-called "local communication" in which the main body apparatus 2 can wirelessly communicate with another main body apparatus 2 placed in a closed local network area, and the plurality of main body apparatuses 2 directly communicate with each other to transmit and receive data.

The main body apparatus 2 includes a controller communication section 83. The controller communication section 83 is connected to the processor 81. The controller communication section 83 wirelessly communicates with the left controller 3 and/or the right controller 4. The communication method between the main body apparatus 2 and the left controller 3 and the right controller 4 is optional. In the exemplary embodiment, the controller communication section 83 performs communication compliant with the Bluetooth (registered trademark) standard with the left controller 3 and with the right controller 4.

The processor 81 is connected to the left terminal 17, the right terminal 21, and the lower terminal 27. When performing wired communication with the left controller 3, the processor 81 transmits data to the left controller 3 via the left terminal 17 and also receives operation data from the left controller 3 via the left terminal 17. Further, when performing wired communication with the right controller 4, the processor 81 transmits data to the right controller 4 via the right terminal 21 and also receives operation data from the right controller 4 via the right terminal 21. Further, when communicating with the cradle, the processor 81 transmits data to the cradle via the lower terminal 27. As described above, in the exemplary embodiment, the main body apparatus 2 can perform both wired communication and wireless communication with each of the left controller 3 and the right controller 4. Further, when the unified apparatus obtained by attaching the left controller 3 and the right controller 4 to the main body apparatus 2 or the main body apparatus 2 alone is attached to the cradle, the main body apparatus 2 can output data (e.g., image data or sound data) to the stationary monitor or the like via the cradle.

Here, the main body apparatus 2 can communicate with a plurality of left controllers 3 simultaneously (in other words, in parallel). Further, the main body apparatus 2 can communicate with a plurality of right controllers 4 simultaneously (in other words, in parallel). Thus, a plurality of users can simultaneously provide inputs to the main body apparatus 2, each using a set of the left controller 3 and the right controller 4. As an example, a first user can provide an input to the main body apparatus 2 using a first set of the left controller 3 and the right controller 4, and simultaneously, a second user can provide an input to the main body apparatus 2 using a second set of the left controller 3 and the right controller 4.

Further, the display 12 is connected to the processor 81. The processor 81 displays a generated image (e.g., an image generated by executing the above information processing) and/or an externally acquired image on the display 12.

The main body apparatus 2 includes a codec circuit 87 and speakers (specifically, a left speaker and a right speaker) 88. The codec circuit 87 is connected to the speakers 88 and a sound input/output terminal 25 and also connected to the processor 81. The codec circuit 87 is a circuit for controlling the input and output of sound data to and from the speakers 88 and the sound input/output terminal 25.

The main body apparatus 2 includes a power control section 97 and a battery 98. The power control section 97 is connected to the battery 98 and the processor 81. Further, although not shown in FIG. 6, the power control section 97 is connected to components of the main body apparatus 2 (specifically, components that receive power supplied from the battery 98, the left terminal 17, and the right terminal 21). Based on a command from the processor 81, the power control section 97 controls the supply of power from the battery 98 to the above components.

Further, the battery 98 is connected to the lower terminal 27. When an external charging device (e.g., the cradle) is connected to the lower terminal 27, and power is supplied to the main body apparatus 2 via the lower terminal 27, the battery 98 is charged with the supplied power.

Figure 7:
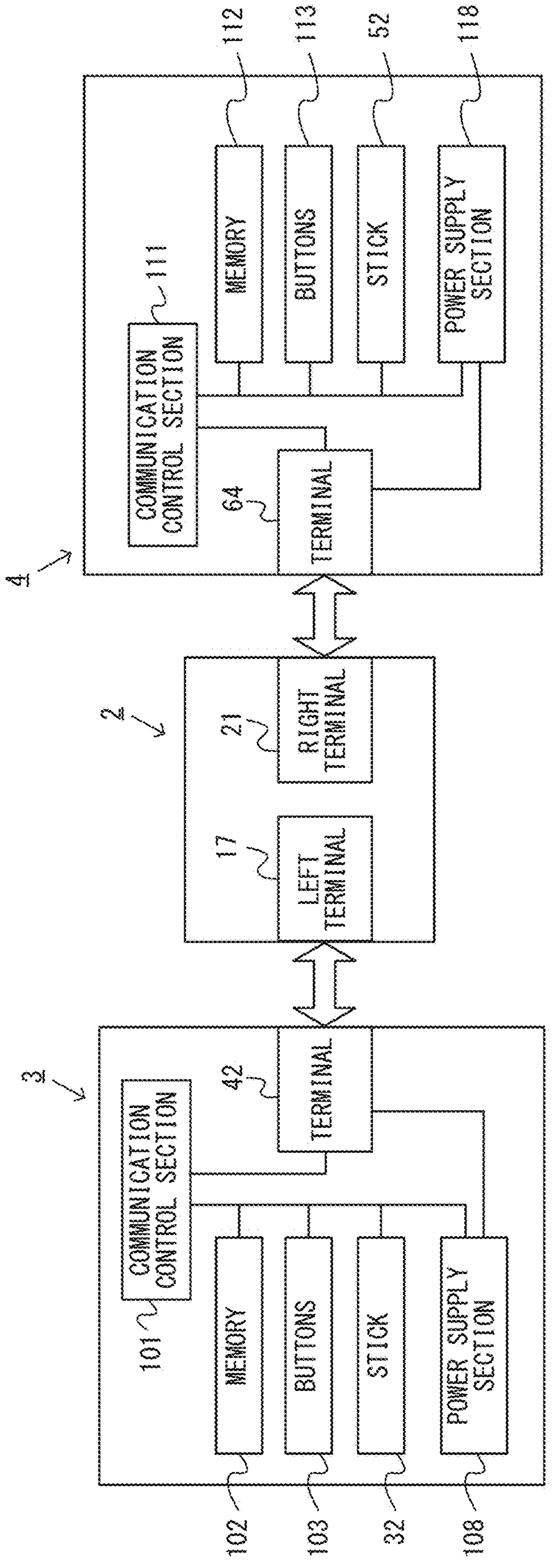
FIG. 7 is a block diagram showing an example of an internal configuration of a non-limiting main body apparatus, a non-limiting left controller and a non-limiting right controller.

FIG. 7 is a block diagram showing examples of the internal configurations of the main body apparatus 2, the left controller 3, and the right controller 4. It should be noted that the details of the internal configuration of the main body apparatus 2 are shown in FIG. 6 and therefore are omitted in FIG. 7.

The left controller 3 includes a communication control section 101, which communicates with the main body apparatus 2. As shown in FIG. 7, the communication control section 101 is connected to components including the terminal 42. In the exemplary embodiment, the communication control section 101 can communicate with the main body apparatus 2 through both wired communication via the terminal 42 and wireless communication not via the terminal 42. The communication control section 101 controls the method for communication performed by the left controller 3 with the main body apparatus 2. That is, when the left controller 3 is attached to the main body apparatus 2, the communication control section 101 communicates with the main body apparatus 2 via the terminal 42. Further, when the left controller 3 is detached from the main body apparatus 2, the communication control section 101 wirelessly communicates with the main body apparatus 2 (specifically, the controller communication section 83). The wireless communication between the communication control section 101 and the controller communication section 83 is performed in accordance with the Bluetooth (registered trademark) standard, for example.

Further, the left controller 3 includes a memory 102 such as a flash memory. The communication control section 101 includes, for example, a microcomputer (or a microprocessor) and executes firmware stored in the memory 102, thereby performing various processes.

The left controller 3 includes buttons 103 (specifically, the buttons 33 to 39, 43, 44, and 47). Further, the left controller 3 includes the analog stick ("stick" in FIG. 7) 32. Each of the buttons 103 and the analog stick 32 outputs information regarding an operation performed on itself to the communication control section 101 repeatedly at appropriate timing.

The communication control section 101 acquires information regarding an input (specifically, information regarding an operation or the detection result of the sensor) from each of input sections (specifically, the buttons 103 and the analog stick 32). The communication control section 101 transmits operation data including the acquired information (or information obtained by performing predetermined processing on the acquired information) to the main body apparatus 2. It should be noted that the operation data is transmitted repeatedly, once every predetermined time. It should be noted that the interval at which the information regarding an input is transmitted from each of the input sections to the main body apparatus 2 may or may not be the same.

The above operation data is transmitted to the main body apparatus 2, whereby the main body apparatus 2 can obtain inputs provided to the left controller 3. That is, the main body apparatus 2 can determine operations on the buttons 103 and the analog stick 32 based on the operation data.

The left controller 3 includes a power supply section 108. In the exemplary embodiment, the power supply section 108 includes a battery and a power control circuit. Although not shown in FIG. 7, the power control circuit is connected to the battery and also connected to components of the left controller 3 (specifically, components that receive power supplied from the battery).

As shown in FIG. 7, the right controller 4 includes a communication control section 111, which communicates with the main body apparatus 2. Further, the right controller 4 includes a memory 112, which is connected to the communication control section 111. The communication control section 111 is connected to components including the terminal 64. The communication control section 111 and the memory 112 have functions similar to those of the communication control section 101 and the memory 102, respectively, of the left controller 3. Thus, the communication control section 111 can communicate with the main body apparatus 2 through both wired communication via the terminal 64 and wireless communication not via the terminal 64 (specifically, communication compliant with the Bluetooth (registered trademark) standard). The communication control section 111 controls the method for communication performed by the right controller 4 with the main body apparatus 2.

The right controller 4 includes input sections similar to the input sections of the left controller 3. Specifically, the right controller 4 includes buttons 113 and the analog stick 52. These input sections have functions similar to those of the input sections of the left controller 3 and operate similarly to the input sections of the left controller 3.

The right controller 4 includes a power supply section 118. The power supply section 118 has a function similar to that of the power supply section 108 of the left controller 3 and operates similarly to the power supply section 108.

2. Outline of Process on Game System

Next, referring to FIG. 8 to FIG. 21, an outline of the process performed on the game system 1 will be described. In the present embodiment, the game system 1 generates a game image in which terrain objects and characters (e.g., the player character controlled by the player) are arranged in a game space, which is a three-dimensional virtual space, and displays the game image on a display device. Note that in the present embodiment, the display device on which the game image is displayed may be the display 12 described above, or may be a stationary monitor.

2-1. Voxel

In the present embodiment, for some objects in the game space, the shape is defined by voxel data. Here, voxels are rectangular parallelepiped (more specifically, cubic) regions arranged in a grid pattern in the game space, and voxel data is data that is set for each voxel. Hereinafter, an object whose shape is defined by voxel data will be referred to as a "voxel object". In the present embodiment, the game system 1 stores voxel data for each of a plurality of voxels that are set in the game space as data for generating voxel objects in the game space.

Figure 8:
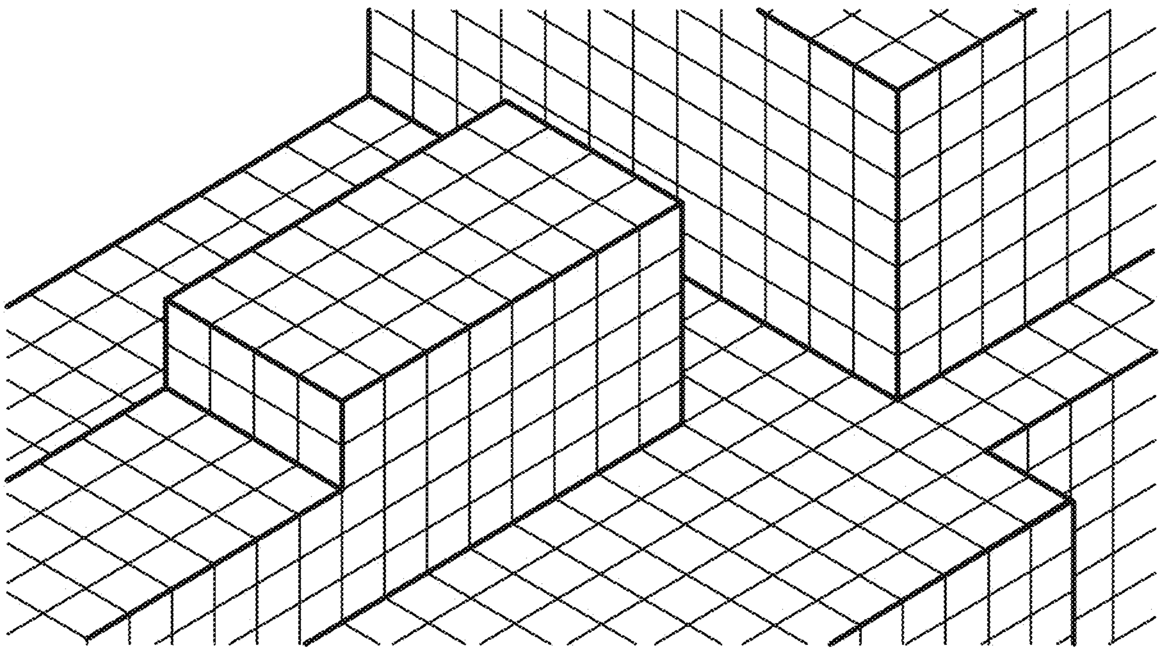
FIG. 8 is a view showing an example of a terrain object, which is a voxel object.

FIG. 8 is a view showing an example of a terrain object, which is a voxel object. As shown in FIG. 8, in the present embodiment, a terrain object representing a terrain such as a ground surface has its shape defined by voxel data. The cubes shown in FIG. 8 represent a terrain object. Note that in FIG. 8, edges of the terrain object are indicated by thick lines. However, these thick lines are added for the purpose of making the drawings easier to understand, and there is no need for edges of the terrain object to be drawn thick.

Figure 15:
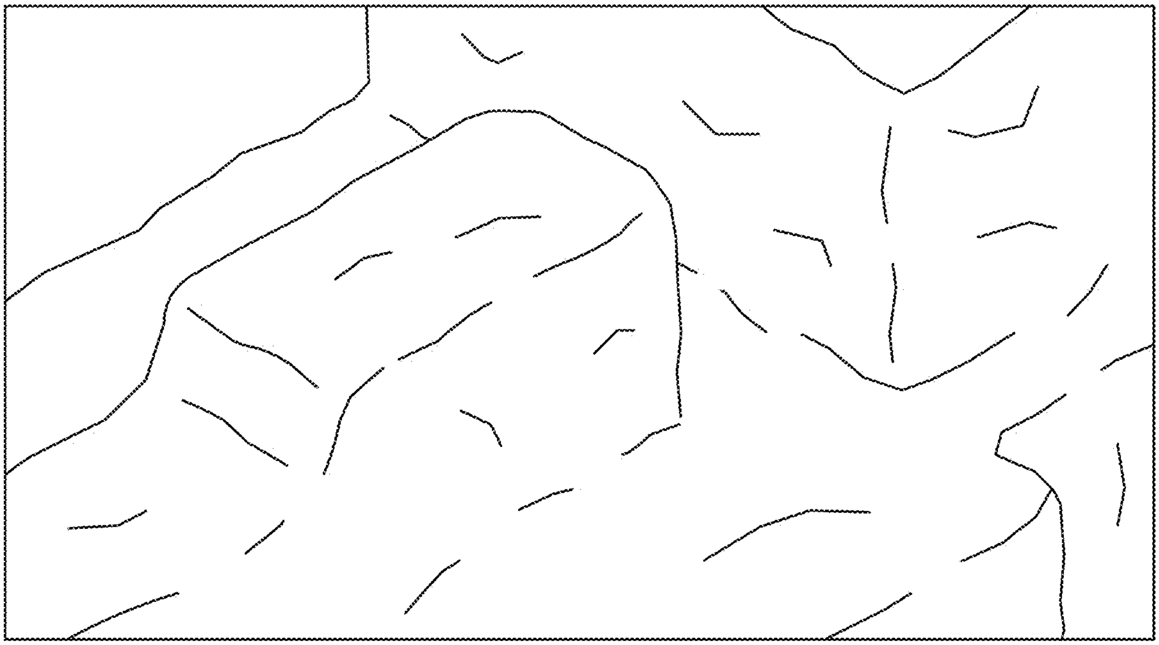
FIG. 15 is a view showing an example of a game image including a terrain object.

For example, the terrain object shown in FIG. 8 is generated by the following rule: "a cube is placed at the position of a voxel if a parameter included in the voxel data set for the voxel is greater than a predetermined value, and nothing is placed at the position of the voxel if the parameter is less than or equal to the predetermined value". A terrain object in FIG. 8 is shown for the purpose of illustrating the relationship between voxels and voxel objects in an easy-to-understand manner. Note that in the present embodiment, in practice, a voxel object is generated (e.g., based on voxel data) by such a rule that results in a terrain object having a complicated shape in comparison with the cubic voxels, such as a terrain object shown in FIG. 15 to be described below, for example. Note that there is no limitation on the rule for determining the shape of the voxel object based on the voxel data. In other embodiments, the game system 1 may generate a voxel object as shown in FIG. 8 based on the object data or may generate a voxel object as shown in FIG. 15 based on the object data.

Figure 9:
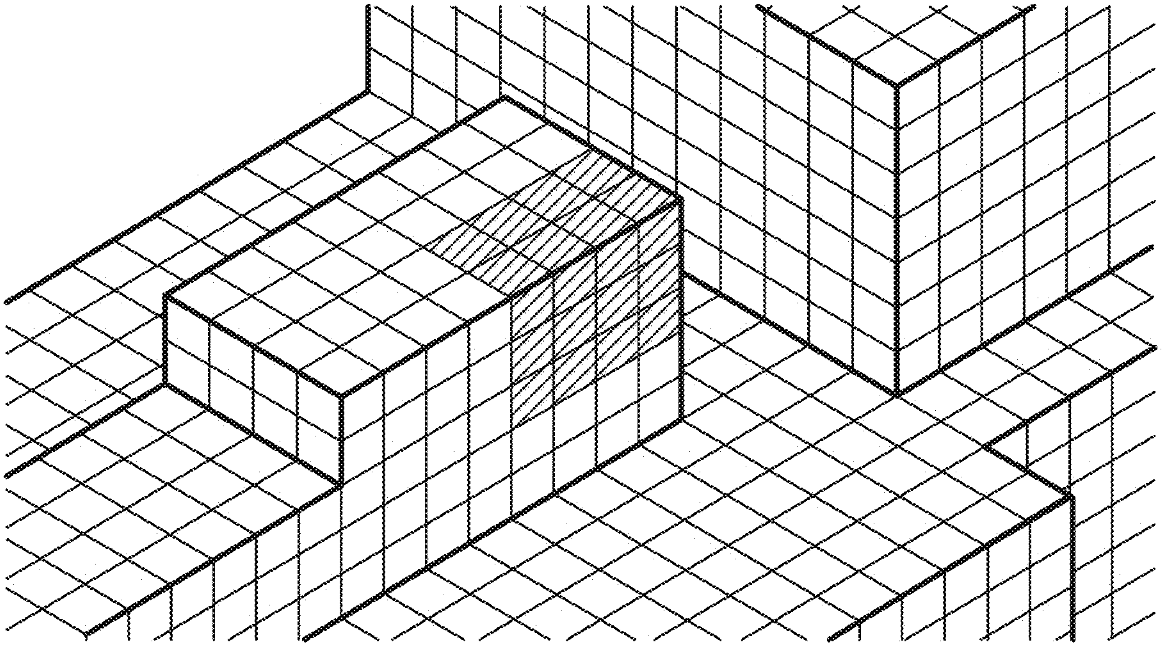
FIG. 9 is a view showing before and after the deletion of a portion of the terrain object shown in FIG. 8.
Figure 10:
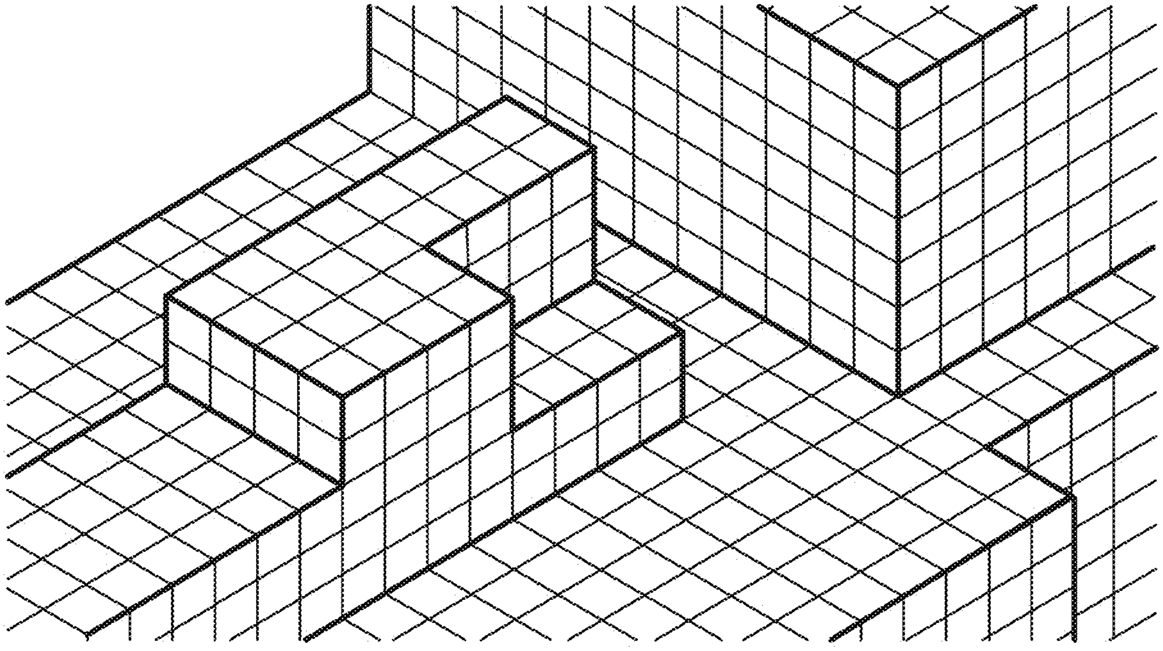
FIG. 10 is a view showing before and after the deletion of a portion of the terrain object shown in FIG. 8.

It is possible to change the shape of a voxel object by changing voxel data of voxels. FIG. 9 and FIG. 10 are views showing before and after the removal of a portion of the terrain object shown in FIG. 8. That is, when the hatched portion of the terrain object shown in FIG. 9 is broken, the terrain object changes to a shape as shown in FIG. 10. In such a case, the game system 1 can easily delete the terrain object by rewriting the voxel data described below so as to indicate that the terrain object is absent for voxels in the hatched portion. Note that also when making an addition to the terrain object, as when deleting the terrain object, the game system 1 can easily change the shape of the terrain object by changing the voxel data of voxels.

Thus, the game system 1 can freely change the shape of a voxel object by rewriting the voxel data. For example, the shape of a terrain object may be changed as a result of the terrain object in a game being broken for some reason (e.g., the player object striking the terrain object). In such a case, the game system 1 can freely change the shape of the terrain object by changing the voxel data used to generate the terrain object, rather than directly changing data representing the outer shape of the terrain object (e.g., the mesh to be described below).

Figure 11:
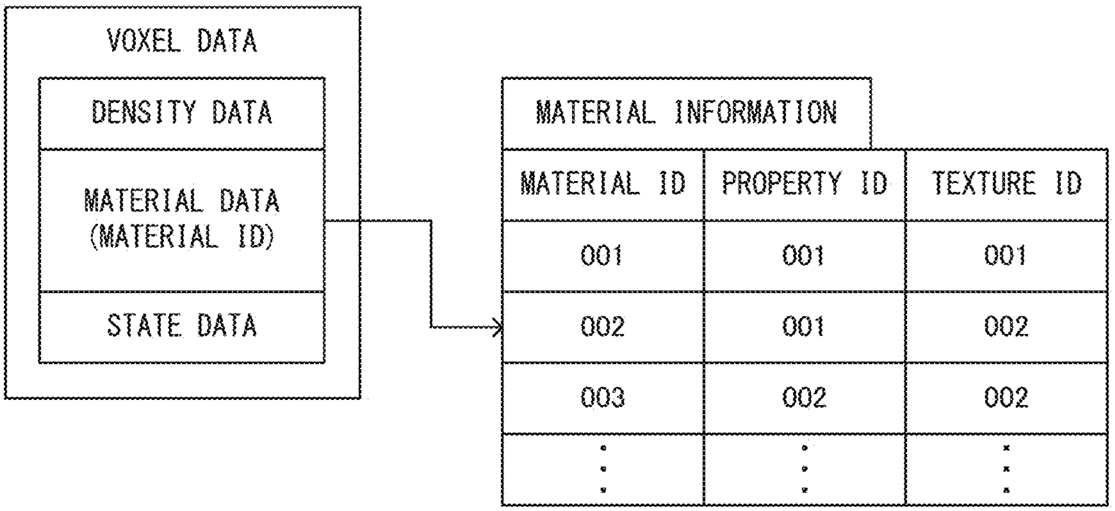
FIG. 11 is a diagram showing an example of content of voxel data and content of material information.

FIG. 11 is a diagram showing an example of content of voxel data. Here, in the present embodiment, the game space can be divided into a plurality of voxels arranged in a grid pattern. The game system 1 stores voxel data for each voxel in the game space so that the voxel data is associated with the voxel. The voxel data represents, for example, the presence/absence of a voxel object in the voxel corresponding to the voxel data.

As shown in FIG. 11, voxel data includes density data. The density data represents the density, which is an index used to define the shape of a voxel object in the voxel corresponding to the voxel data (specifically, the shape defined by the mesh to be described below). As will be described in detail below, the position and the shape of the surface of the voxel object (e.g., the mesh to be described below) are determined based on this density. In other words, in the present embodiment, this density is used to generate a mesh that defines the surface of the voxel object.

In the present embodiment, the density can take an integer value in the range from the lower limit value (e.g., 0) to the upper limit value (e.g., 255). In the present embodiment, the game system 1 determines the shape of a voxel object based on the density such that the proportion of the volume to be occupied by the voxel object in a voxel tends to be higher when the density value set for the voxel is higher and that the proportion tends to be lower when the density value is lower. Thus, the density is an index that affects the proportion of the volume to be occupied by the voxel object in the voxel. The density can also be said to be an index that represents the degree to which an object is included in the region defined by each voxel. For example, if the density is 0, there is no voxel object in the voxel, if the density is 255, the inside of the voxel is entirely the voxel object, and if the density is between 0 and 255, the inside of the voxel is occupied by the voxel object to the proportion that is determined based on the density value. Then, the shape of the mesh, e.g., the shape of the voxel object, can determined based on the density. Note however that the voxel object generated based on the density does not need to have a volume that exactly matches the proportion represented by the density. For example, the method of generating a voxel object as shown in FIG. 8 and the method of generating a voxel object as shown in FIG. 15 may differ in the volume of the voxel object, even if they are based on the same density.

In other embodiments, the density may indicate either a state in which the voxel object occupies the entirety of the region within the voxel or a state in which no voxel object is included in the region within the voxel. For example, the density data may be data that can take only 0 or 1.

As shown in FIG. 11, voxel data includes material data. The material data represents the material (in other words, the substance) of the voxel object generated by the voxel data. Here, in the present embodiment, materials such as sand, rock and soil, for example, are set for voxel objects. That is, in the present embodiment, a plurality of types of materials are provided as materials that can be set for a voxel object, and one of the materials is set for a voxel object.

As shown in FIG. 11, in the present embodiment, the material data represents the identification information of the material (referred to as "material ID"). In the present embodiment, the game system 1 stores material information representing the property and the texture of the material for each material provided in the game. In the present embodiment, the material information represents associations between the material ID, the property of the material and the appearance (specifically, the texture) of the material. Specifically, the material information is information that represents associations between the material ID, identification information of the property of the material (referred to as "property ID") and identification information of the texture of the material (referred to as "texture ID") (see FIG. 11).

FIG. 12 is a diagram showing an example of property information representing properties of materials. As shown in FIG. 12, the game system 1 stores property information that associates each property ID with information that represents the content of the property represented by the property ID. A property of a material is a property of a voxel object for which the material is set in the game, and it may be information such as weight or slipperiness shown in FIG. 12, for example. Note that there is no limitation on the specific content of property. For example, the following information may be set as properties of a material.

- Temperature
- Breakability (e.g., the number of times of impact impartation needed to break a voxel object)
- Whether another object can be bonded to a voxel object
- Amount of hit points to be regained by the player character when the player character breaks a voxel object
- Amount of in-game currency to be gained by the player character when the player character breaks a voxel object Note that there is no limitation on the specific content of the property to be set for a material. In other embodiments, information different from those listed above may be set as information that represents a property of a material.

FIG. 13 is a diagram showing an example of texture information representing textures of materials. As shown in FIG. 13, the game system 1 stores texture information that associates the texture ID with the texture represented by the texture ID.

Note that in addition to information of texture, any information regarding the color and/or pattern may be set as data that defines the appearance of a voxel object. For example, a pattern of cracks may be set as information regarding the appearance of a voxel object. By using such a pattern, the game system 1 can generate an image of a voxel object that represents the appearance of cracks.

As described above, in the present embodiment, the material data defines, by the material ID, the property of the voxel object and the texture used for the voxel object. For example, when the material ID represented by the material data included in the voxel data is "002", the property represented by the property ID "001" that is associated with the material ID in the material information is set as the property of the voxel object corresponding to the voxel data (see arrow shown in FIG. 11). In this case, the texture that is represented by the texture ID "002" associated with the material ID in the material information is applied to the voxel object corresponding to the voxel data (see arrow shown in FIG. 11).

As described above, in the present embodiment, the game system 1 separately manages the property and the texture of the material. Therefore, in the present embodiment, it is possible to easily set a plurality of types of materials having the same property but having different appearances (e.g., different textures) or set a plurality of types of materials having different properties but having the same appearance.

Note that the material data may be any data with which it is possible to identify the property and/or the texture of the material. For example, in other embodiments, the material data may represent the property ID and the texture ID, or may have a data structure that actually includes data representing the property and the texture of the material.

The material data may further represent information related to the material other than the property and the texture described above. For example, the material data may include special effect data that represents the special effect to be triggered upon satisfaction of a special effect triggering condition set for the voxel object (e.g., a portion of the voxel object being broken, or the character stepping on the voxel object). Note that the special effect data may be data that represents a special effect image (e.g., a special effect image showing the voxel object being broken), or may be data that represents a special effect sound (a sound of footstep when the character walks on the voxel object).

As shown in FIG. 11, the voxel data includes state data that represents the state of the voxel object. There is no limitation on the specific content of the state data. For example, the state data may be data that represents whether the voxel object is in a wet state, or may be data that represents the amount of damage applied to the voxel object. The content of the state data may be updated during the game.

2-2. Mesh

In the present embodiment, the surface of the voxel object is represented by a mesh. A mesh is a set of faces (specifically, polygons) placed in the game space. In the present embodiment, the game system 1 generates a mesh for the voxel object based on the voxel data of each voxel set in the game space. An example of how a mesh is generated based on voxel data will now be described.

Figure 14:
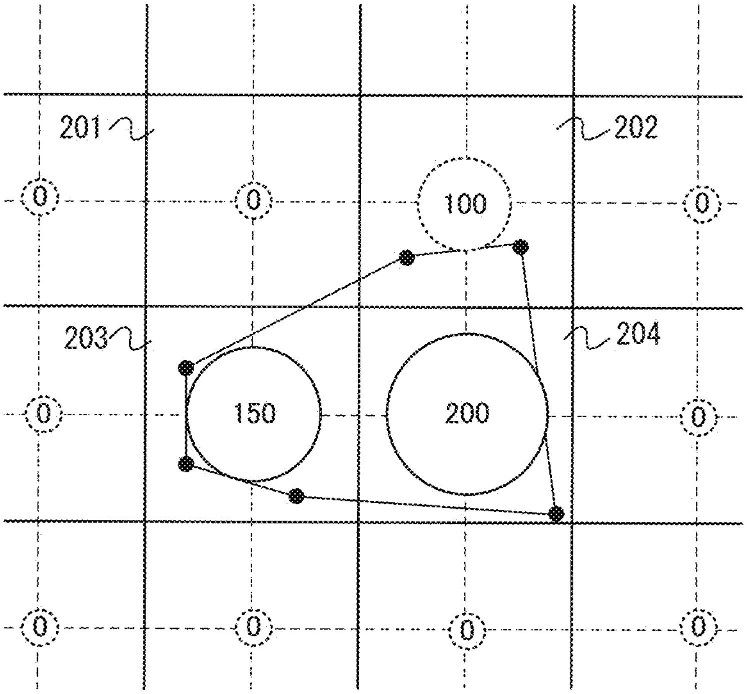
FIG. 14 is a diagram showing a method for generating a mesh.

FIG. 14 is a diagram showing an example method for generating a mesh. Note that in FIG. 14, voxels and meshes are represented in two dimensions for the purpose of making the drawing easier to understand and for the sake of discussion, but in practice, a three-dimensional mesh is generated based on voxels in a three-dimensional space.

As described above, in the present embodiment, the density set for the voxel is in the range of 0 to 255. In the present embodiment, voxels with densities equal to or greater than the reference value are considered to be inside the voxel object, and voxels with densities less than the reference value are considered to be outside the voxel object. It is not necessary to define only voxels with a density of 0 as being outside the voxel object (e.g., reference value=1), and the reference value may be set to 128, for example. In the example shown in FIG. 14, a voxel 201 and the other outer voxels have a density of 0, a voxel 202 has a density of 100, which is less than the reference value, and voxels 203 and 204 have densities of 150 and 200, which are greater than the reference value (e.g., 128). In the present embodiment, the game system 1 generates vertices between those voxels whose densities are equal to or greater than the reference value and those voxels whose densities are less than the reference value. Specifically, for each region (region delimited by dotted lines) that straddles eight (four in the figure) adjacent voxels, it is determined whether or not to generate a vertex. That is, a vertex is generated in each region that straddles both a voxel whose density is equal to or greater than the reference value and a voxel whose density is less than the reference value. Then, a polygon mesh is generated by connecting together adjacent vertices if the connection (the boundary between the regions including the vertices) passes through a voxel whose density is equal to or greater than the reference value and a voxel whose density is less than the reference value. The coordinates of each vertex are determined by comparing densities of adjacent voxels and interpolating based on the difference in density for each of the XYZ axes. In this process, the coordinates can be further calculated based on the normal information. The normal information may be stored in advance for at least some of the voxels, or if not stored, the normal information may also be calculated based on densities between adjacent voxels. Note that in FIG. 14, the density of the voxel 202 is less than the reference value, the voxel 202 is treated as being outside the voxel object in the determination of the presence/absence of a vertex, but the density value itself of the voxel 202 is used to calculate the coordinates of the vertices generated. If the reference value were set to a value lower than the density of the voxel 202, it would result in an increase in the vertices on the upper right side and the upper left side in the voxel 202 of FIG. 14.

By generating a polygon mesh as described above, it is possible to generate a shape whose volume is based on (e.g., reflects) the density of each voxel to some extent. Note however that depending on the relationship with neighboring voxels, it is possible that a voxel with a density of 0 may partially include a region inside the voxel object, or a voxel with a density of 255 may partially include a region outside the voxel object. Since voxels with densities less than the reference value are treated as being outside the voxel object in the present embodiment, there are fewer vertices as compared with a case where those voxels are treated as being inside the voxel object, the volume will be smaller accordingly. That is, there is no need to calculate the polygon mesh so that the volume strictly corresponds to the density value.

FIG. 15 shows an example of a game image including a terrain object. In the present embodiment, by generating a mesh as described above, the voxel object can be made in a shape with complicated irregularities compared to the cubic voxels, for example.

Note that there is no limitation on the method of generating a mesh based on voxel data. For example, in other embodiments, if the density of the voxel data is greater than a predetermined value, a mesh may be generated so that a cube is placed in the voxel (see FIG. 8).

For each face of the mesh generated as described above, the game system 1 determines the appearance (e.g., color and/or pattern) of each such face according to the material identified by the voxel data. Specifically, the game system 1 determines the texture to be used for rendering each face of the mesh based on the voxel data, and maps the determined texture to each face to generate an image of the voxel object. Note that the texture to be mapped to each face of the mesh is determined based on the voxel data of the voxel used to generate the face (which will be referred to as the target voxel) among the voxels where the voxel object exists. Note that the target voxel is, for example, one or more voxels located around the face, although it depends on the mesh generation method. That is, the texture mapped to a face of the mesh is determined to be a texture corresponding to the material set for one or more voxels placed around the face.

Note that in other embodiments, one voxel data may include multiple types (e.g., two types) of material data. In such a case, the voxel data includes ratio data related to the multiple types of material data. The ratio data is data for determining the texture to be used for the voxel object, and represents the ratio by which each of the materials (specifically, the texture corresponding to the material) represented by the multiple types of material data influences the appearance (specifically, the color and/or pattern) of the voxel object. When determining the texture to be mapped to each face of the mesh, the texture is determined based on various data (specifically, density data, multiple types of material data and ratio data) included in the voxel data of the target voxel. For example, when multiple types of materials are set for a target voxel corresponding to one face, a texture corresponding to the (one type of) material with the greatest degree of influence may be used while taking the ratio into consideration, or textures corresponding to multiple types of materials may be used while taking the ratio into consideration.

In other embodiments, there may be both voxel objects for which voxel data including one type of material data is used, and voxel objects for which voxel data including two types of material data is used.

2-3. Primary Voxel and Sub-Voxel

In addition to the terrain object described above, other objects that are different from the terrain object may be generated as voxel objects in the present embodiment. For example, other objects are rock objects and enemy objects, etc., to be described below.

Here, in the present embodiment, the shapes of the other objects are defined by voxel data related to voxels that are different from the terrain object. Hereinafter, the voxel space related to the terrain object is called "primary voxel space", voxels in the primary voxel space are called "primary voxels", and voxel data set in the primary voxels are called "primary voxel data". On the other hand, the voxel space related to the other objects is called "sub-voxel space", voxels in the sub-voxel space are called "sub-voxels", and voxel data set in the sub-voxels are called "sub-voxel data". In the present embodiment, the shape of the terrain object is defined by the primary voxel data, and the shapes of the other objects are defined by the sub-voxel data. In the present embodiment, a voxel object whose shape is defined by primary voxel data is called "primary voxel object", and a voxel object whose shape is defined by the sub-voxel data is called "sub-voxel object".

Figure 16:
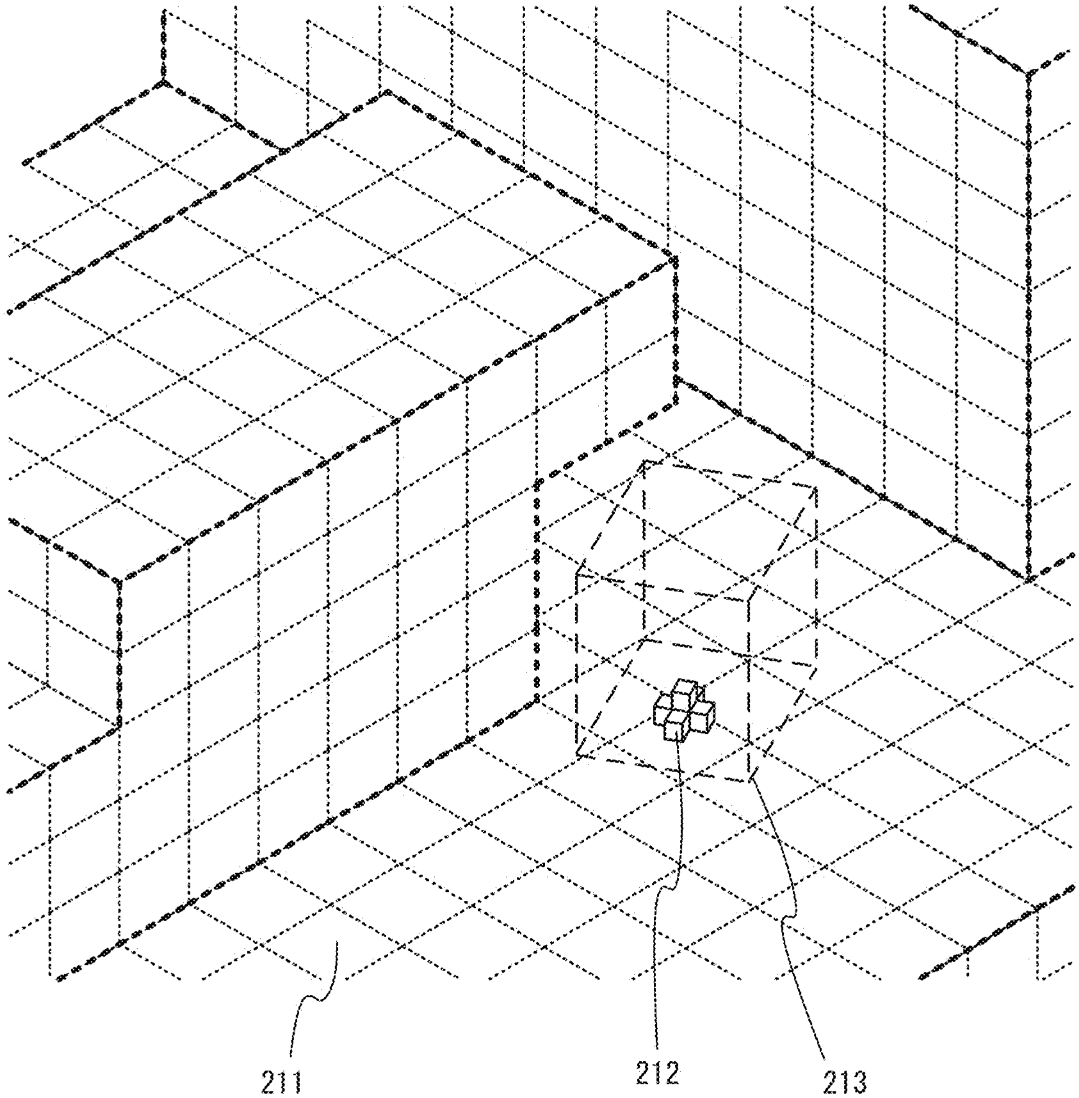
FIG. 16 is a diagram showing an example of a primary voxel object and a sub-voxel object.

FIG. 16 shows an example of a primary voxel object and a sub-voxel object. Note that for the purpose of showing the difference between a primary voxel and a sub-voxel in an easy-to-understand manner, FIG. 16 shows voxel objects (e.g., a terrain object 211 and a rock objects 212) for which a mesh is generated according to the same rules as when generating the mesh for the terrain object shown in FIG. 8. That is, for a voxel object shown in FIG. 16, a mesh is generated according to the rule "If the density set for the voxel is greater than a predetermined value, a cube is arranged at the position of that voxel, and if the density is less than or equal to the predetermined value, nothing is arranged at the position of that voxel". Note that in FIG. 16, for the purpose of making the figure easier to understand, the terrain object 211 is indicated by dotted lines, the rock object 212 is indicated by solid lines, and a region 213 of a sub-voxel space is indicated by broken lines.

For the terrain object 211, the shape is defined by primary voxel data. Note that in the present embodiment, the primary voxel space is set in the entire game space (therefore, the range of the primary voxel space is not shown in FIG. 16).

On the other hand, for the rock object 212, the shape is defined by sub-voxel data. Here, in the present embodiment, the sub-voxel space is set in a part of the game space (which can be said to be a part of the primary voxel space). Note that in the example shown in FIG. 16, the area 213 indicated by broken lines is the range where the sub-voxel space is set. The shape of the rock object 212 is defined by sub-voxel data set for each sub-voxel set in the sub-voxel space. The rock object 212 is arranged within the range of the sub-voxel space.

The length of one side of a sub-voxel may be set to be different from or the same as the length of one side of a primary voxel. Note that as shown in FIG. 16, for example, by setting a sub-voxel space in which voxels of which the length of one side is shorter than that of the primary voxel are defined as sub-voxels, the shape of a sub-voxel object based on sub-voxel data can be expressed more finely than a terrain object based on primary voxel data.

In the present embodiment, the game system 1 sets the directions of the coordinate axes in the sub-voxel space (e.g., the direction of each side of the sub-voxel) independently of the directions of the coordinate axes in the primary voxel space (e.g., the direction of each side of the primary voxel). For example, in the example shown in FIG. 16, the directions of the coordinate axes in the sub-voxel space are different from the directions of the coordinate axes in the primary voxel space. This makes it easier to arrange sub-voxel objects in any orientation in the game space. For example, it becomes easier to arrange sub-voxel objects so that they extend in a direction different from the coordinate axes in the primary voxel space. It is also easier to move (e.g., rotate) sub-voxel objects independently of the terrain object.

Note that the game system 1 can change the position (more precisely, its position in the game space) of the sub-voxel object by changing the position of the sub-voxel space in the game space. The game system 1 can change the tilt (more precisely, the tilt in the game space) of the sub-voxel object by changing the tilt of the sub-voxel space with respect to the game space.

In the present embodiment, when multiple sub-voxel objects are generated, the game system 1 sets a sub-voxel space for each sub-voxel object. This allows the position and tilt of each sub-voxel space in the game space to be set for each sub-voxel space. It also makes it easier to generate multiple sub-voxel objects that have different shapes (e.g., multiple sub-voxel objects with shapes that extend in different directions from each other). The sub-voxel spaces may be arranged so that a portion of a sub-voxel space overlaps with a portion of another sub-voxel space. In other embodiments, multiple sub-voxel objects may be set in one sub-voxel space.

The method of generating the mesh for a sub-voxel object based on sub-voxel data may be the same as or different from the method of generating the mesh for the terrain object based on primary voxel data.

2-4. Process of Changing Tilt of Enemy Character Object

Next, the process of changing the tilt of an enemy object which is a voxel object (hereinafter simply referred to as an "enemy character") will be described. In the present embodiment, a portion of a predetermined enemy character is composed of a voxel object. Therefore, the voxel object part (referred to as the "voxel portion") of the enemy character is deforms in the game (e.g., a portion thereof may be removed so that the volume thereof decreases, or a new portion may be added so that the volume thereof increases). In this process, the game system 1 makes the behavior of the enemy character (e.g., its action and posture) natural by changing the tilt of the enemy character in response to deformation of the voxel portion. The details of the process of changing the tilt of the enemy character will now be described.

2-4-1. Configuration of Enemy Character

Figure 17:
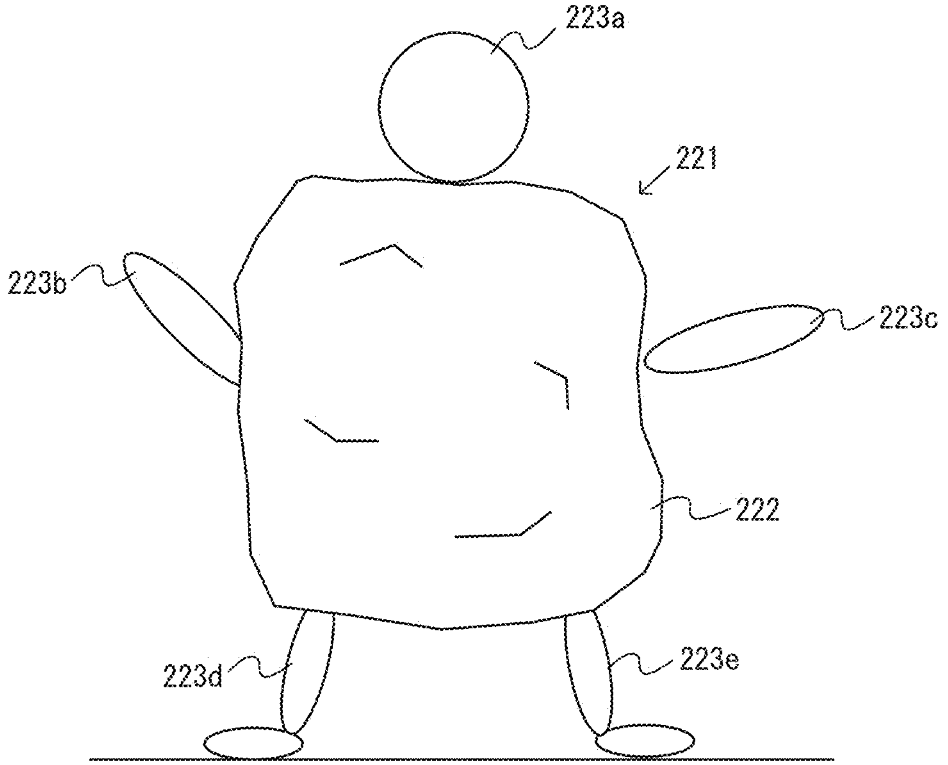
FIG. 17 is a diagram showing an example of an enemy character.

FIG. 17 is a diagram showing an example of an enemy character. As shown in FIG. 17, an enemy character 221 includes a voxel portion 222 and non-voxel portions **223*a* to 223*e* (hereinafter referred to collectively as "non-voxel portions 223"). The voxel portion 222 is a portion that is the voxel object and is a portion that is composed of a mesh generated based on voxel data. The non-voxel portions 223 are portions that are not the voxel object and are portions that are composed of a mesh not generated based on voxel data. In the example shown in FIG. 17, the enemy character 221 includes a voxel portion 222 being the torso and non-voxel portions 223 being the head and limbs. The voxel portion 222 is a sub-voxel object described above. Note that, in other embodiments, at least a portion of the enemy character 221 may be a voxel portion, and the entirety of the enemy character 221** may be a voxel portion.

Note that the voxel portion 222 being the torso of the enemy character 221 is set to a rock material. That is, the material data set in the voxel data of the voxel portion 222 represents a rock material. In the present embodiment, the enemy character 221 is a character that has the appearance of a rock with limbs attached to it.

Figure 18:
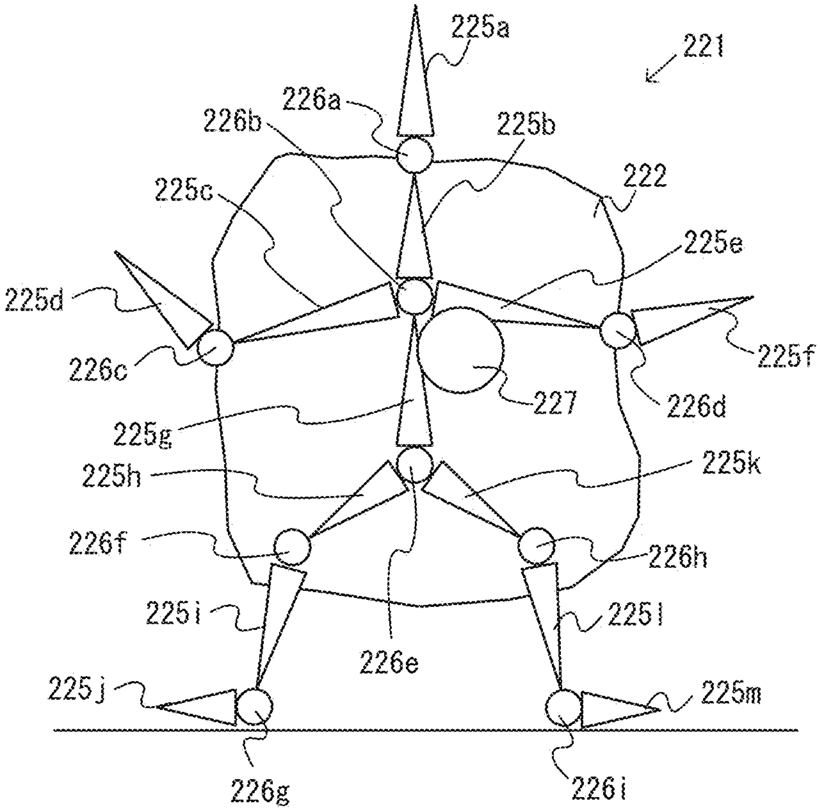
FIG. 18 is a diagram showing an example of the configuration of the enemy character shown in FIG. 17.

FIG. 18 is a diagram showing an example of the configuration of the enemy character shown in FIG. 17. As shown in FIG. 18, the enemy character 221 includes a plurality of bones 225*a* to 225*m* (hereinafter referred to collectively as "bones 225") and a plurality of joints 226*a* to 226*i* (hereinafter referred to collectively as "joints 226").

The bone 225 defines the positions and orientations of the parts of the enemy character 221. Specifically, the non-voxel portions 223 of the enemy character 221 are each associated with one of the bones 225. The position and orientation of the non-voxel portion 223 are determined according to the position and orientation of a bone 225 associated therewith (specifically, so that they coincide with the position and orientation of the bone 225). Note that, as shown in FIG. 18, some bones (the bones 225*b*, 225*c*, 225*e*, 225*g*, 225*h* and 225*k* in FIG. 18) are arranged inside the voxel portion 222. Although not shown in FIG. 17, the enemy character 221 includes not only the non-voxel portions 223 that are arranged outside the voxel portion 222 but also non-voxel portions that are associated with bones arranged inside the voxel portion 222. These non-voxel portions may be exposed by the removal of a portion of the voxel portion 222.

The joints 226 connect together a plurality of bones. A joint 226 connects one end of a bone to one end of another bone. The position and orientation of a bone 225 are determined on the condition of maintaining the connection with another bone 225 that is connected thereto by a joint 226. The game system 1 controls the action of the enemy character 221 by moving the bones 225 under the restriction that they are connected together by the joints 226.

The voxel portion 222 is associated with a predetermined reference position of the enemy character 221 and arranged such that a predetermined position of the voxel portion 222 is located at the reference position. In the present embodiment, the reference position is assumed to be the position of the pelvic joint 226*e* of the enemy character 221. However, the location of the reference position is arbitrary and may be different from the pelvic in other embodiments. As will be described in detail below, when the game system 1 changes the tilt of the voxel portion 222, the game system 1 rotates the voxel portion 222 about the reference position.

In the present embodiment, the enemy character 221 includes a core 227 as one of the non-voxel portions. As will be described in detail below, the core 227 is a part of the enemy character 221 that is to be the weakness. The core 227 is arranged at the position of the heart of the enemy character 221, for example.

2-4-2. Process of Tilting Enemy Character

Figure 19:
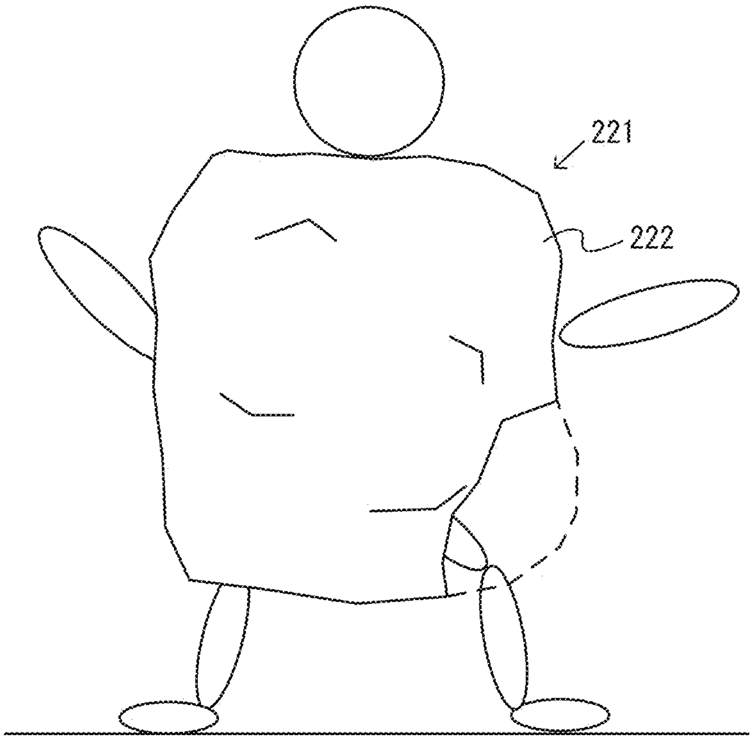
FIG. 19 is a diagram showing an example where a voxel portion of the enemy character shown in FIG. 17 has been removed.

Next, the process of tilting the enemy character 221 in response to the deformation of the voxel portion 222 of the enemy character 221 will be described. FIG. 19 is a diagram showing an example where a portion of the voxel portion of the enemy character shown in FIG. 17 has been removed. In the present embodiment, in response to an event in which the voxel portion 222 is attacked by the player character, the attacked portion of the voxel portion 222 is removed (see FIG. 19). In the example shown in FIG. 19, the lower right portion of the voxel portion 222 is removed.

Figure 20:
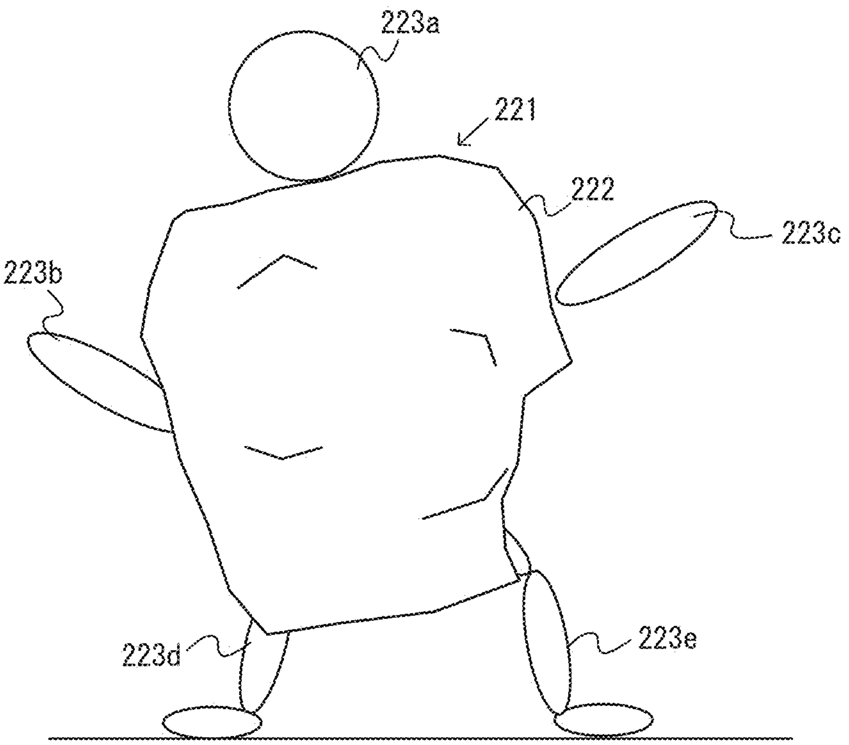
FIG. 20 is a diagram showing an example where an enemy character is tilted.

If a portion of the voxel portion 222 is removed as described above, the game system 1 changes the posture of the enemy character 221 by tilting the enemy character 221. FIG. 20 is a diagram showing an example where the enemy character is tilted. In the examples shown in FIG. 19 and FIG. 20, the lower right portion of voxel portion 222 is removed, and therefore, the left portion of the voxel portion 222 is relatively heavier than the right portion (it can be said that the center of gravity has shifted to the left). Therefore, in the present embodiment, the game system 1 changes the tilt of the enemy character 221 so that the left side portion of the voxel portion 222 is lower than the right side portion (see FIG. 20). This allows the game system 1 to make the enemy character 221 take a natural posture in response to the removal of the portion of the voxel portion 222.

Figure 21:
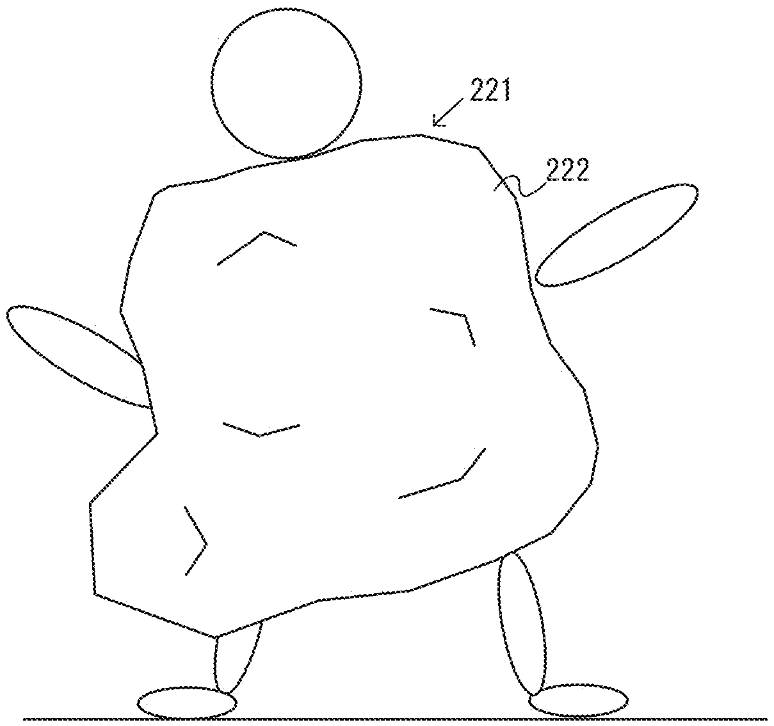
FIG. 21 is a diagram showing an example where the volume of the voxel portion of the enemy character shown in FIG. 17 is increased.

Note that an event that deforms the voxel portion 222 is not limited to an event that reduces the volume of the voxel portion 222 (e.g., an event in which the voxel portion 222 is attacked by the player character), but can also be an event that increases the volume of the voxel portion 222. FIG. 21 is a diagram showing an example where the volume of the voxel portion of the enemy character shown in FIG. 17 is increased. In the present embodiment, the game system 1 increases the volume of the voxel portion 222 in response to an event in which other objects that can attach to the voxel portion 222 (referred to as "attachment objects") come into contact with the voxel portion 222. Specifically, the game system 1 changes the shape of the voxel portion 222 so that the voxel portion 222 is shaped as if the attachment object were bonded to the voxel portion 222 (e.g., so that the volume of the voxel portion 222 increases by the attachment object).

Note that the attachment object is, for example, a voxel object for which a material is set that has a property such that it can attach to the material of the voxel portion 222. That is, if the material of the voxel portion 222 and the material of another voxel object are a particular combination, the game system 1 determines that the other voxel object is an attachment object.

When the volume of the voxel portion 222 is increased as described above, as when the volume is decreased, the game system 1 changes the posture of the enemy character 221 by tilting the enemy character 221. Note that in the example shown in FIG. 21, the left side portion of the voxel portion 222 is relatively heavier than the right side portion because a new portion is added to the lower left portion of the voxel portion 222. Therefore, in the example shown in FIG. 21, as in the example shown in FIG. 20, the game system 1 changes the tilt of the enemy character 221 so that the left side portion of the voxel portion 222 is lower than the right side portion. Thus, when the volume of the voxel portion 222 is increased, as when the volume is decreased, the game system 1 can make the enemy character 221 take a natural posture in response to the deformation of the voxel portion 222.

As described above, in the present embodiment, the game system 1 updates the voxel data so that the volume of the enemy character is decreased (or increased) when an event that deforms the voxel portion of the enemy character occurs. When the voxel data is updated, the game system 1 generates a mesh for the enemy character based on the updated voxel data and changes the tilt of at least a portion of the enemy character with respect to the virtual space. Therefore, it is possible to make the enemy character 221 take a natural posture in response to the change in which the volume of the enemy character increases or decreases.

Note that the events described above are not limited to those that occur in response to the enemy character being attacked or being contacted by another object, but may be those that occur under any conditions. In other embodiments, the volume of the voxel portion of the enemy character may decrease or increase over time in response to satisfaction of a certain condition in the game. For example, the voxel portion of the enemy character may become smaller as it breaks down or melts over time, or it may become larger as the voxel portion swells over time. In this process, the game system 1 may tilt the enemy character in response to the decrease or increase in volume.

Figure 22:
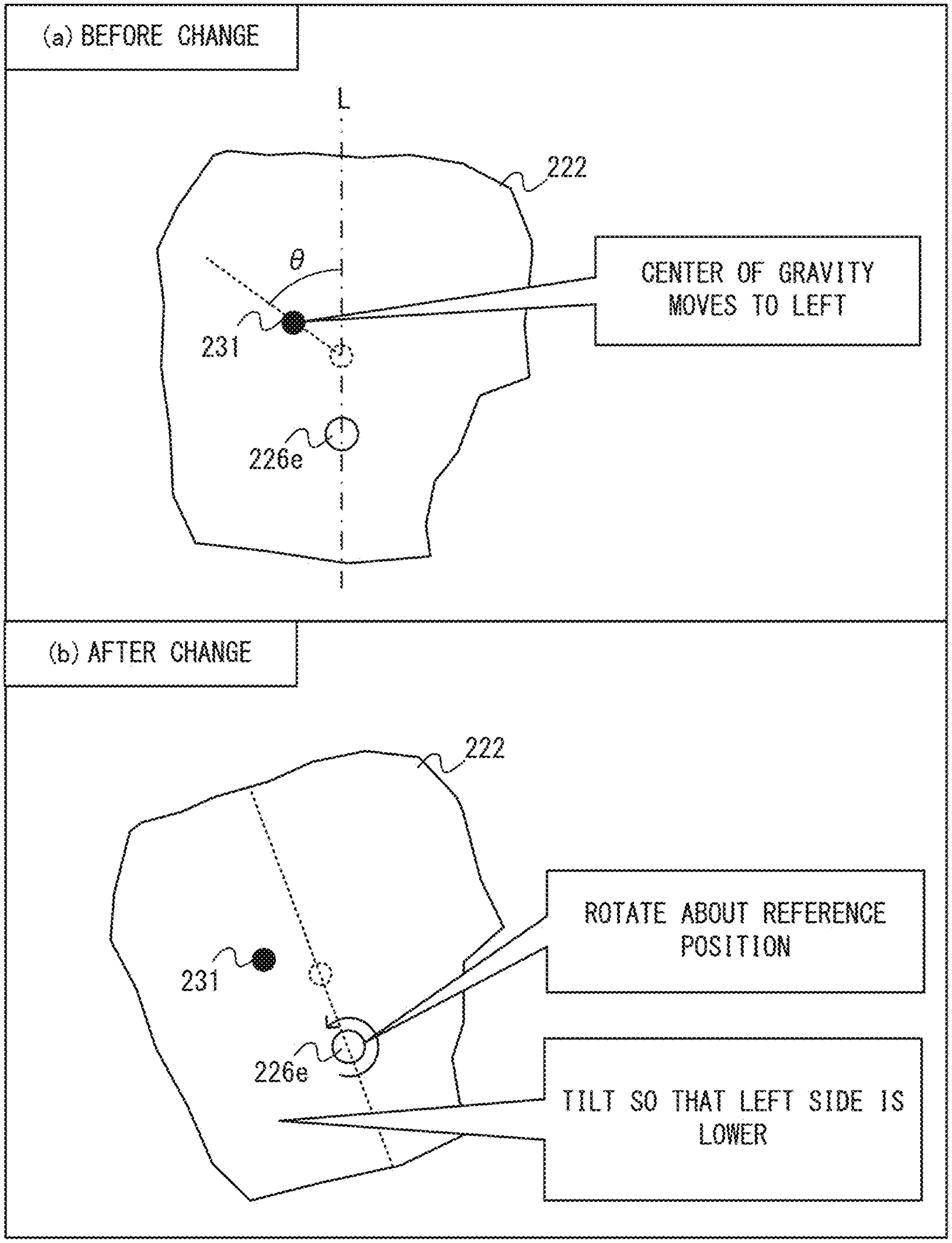
FIG. 22 is a diagram showing an example of the voxel portion of the enemy character before and after the change to tilt the voxel portion of the enemy character.

FIG. 22 is a diagram showing an example of the voxel portion of the enemy character before and after the change to tilt the voxel portion of the enemy character. Referring to FIG. 22, the direction and amount of tilting the voxel portion 222 will be described using an example where a portion of the voxel portion 222 (specifically, the lower right portion) is removed.

When the voxel portion 222 is deformed, the game system 1 calculates the position of the center of gravity 231 of the deformed voxel portion 222. In the example shown in FIG. 22, the center of gravity 231 has moved to the left side of the reference axis L (see (a) in FIG. 22) due to the deformation of the voxel portion 222. The reference axis L is an axis that passes through the center of gravity of the voxel portion 222 in the reference state and is parallel to the direction of gravity (the vertically downward direction in FIG. 22). Note that in FIG. 22, the position of the center of gravity in the reference state is indicated by a dotted line. The reference state may be the initial state at the time of appearance of the enemy character, but it does not need to be the initial state. For example, if the voxel portion 222 gradually deforms into a predetermined shape from its shape at the time of appearance of the enemy character, the reference state may be the state when the predetermined shape is achieved.

As shown in FIG. 22, if the center of gravity 231 moves to the left relative to the reference axis L, the game system 1 tilts the voxel portion 222 by rotating the voxel portion 222 in such a direction that the portion of the voxel portion 222 that is on the left side of the reference axis L comes closer to the side of the gravity direction (e.g., the lower side) and that the portion on the right side, which is the opposite side, comes closer to the opposite side of the gravity direction (e.g., the upper side) (see (b) in FIG. 22). Note that, as described above, the game system 1 rotates the voxel portion 222 about the reference position.

Figure 23:
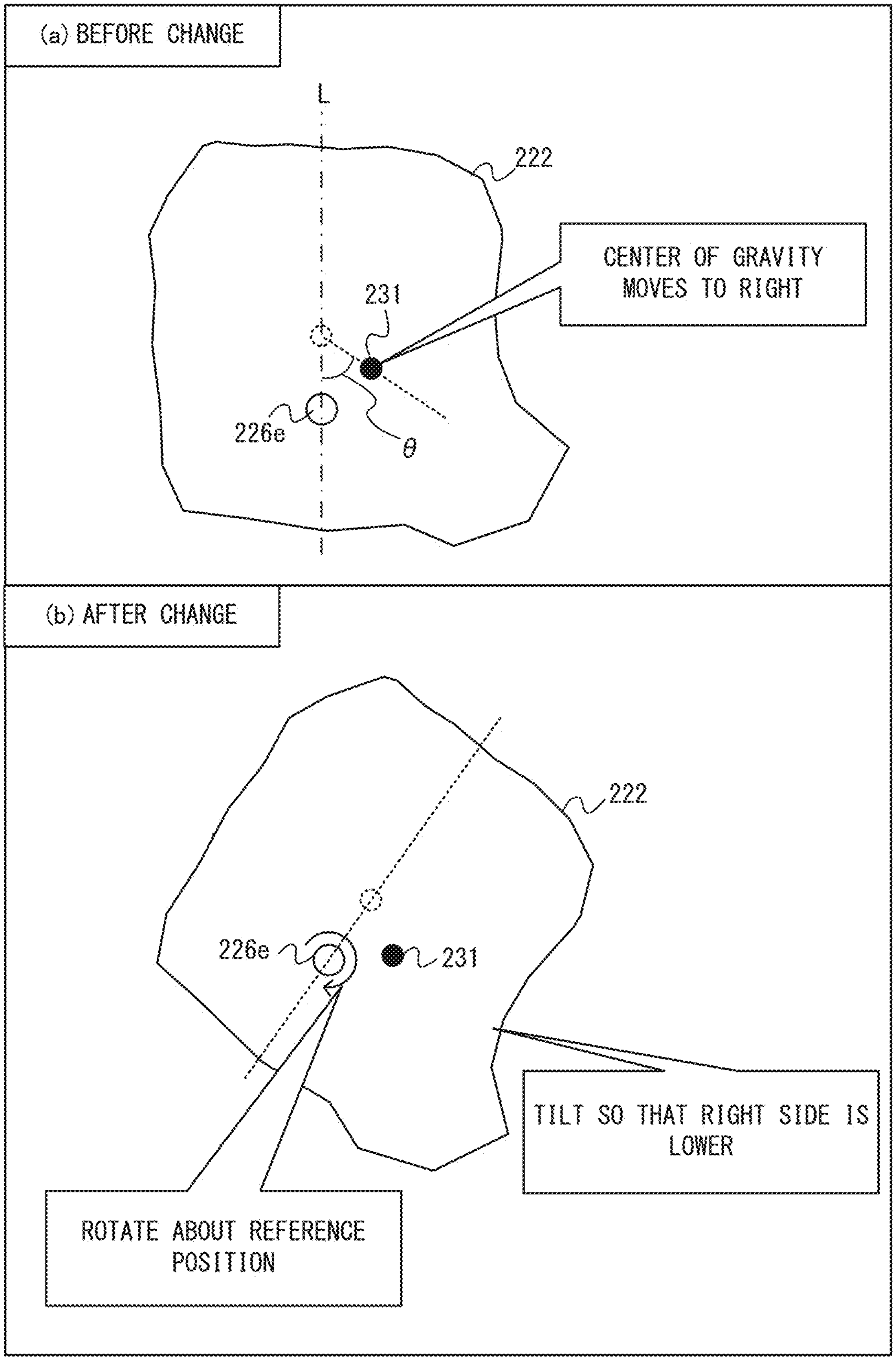
FIG. 23 is a diagram showing another example of the voxel portion of the enemy character before and after the change to tilt the voxel portion of the enemy character.

FIG. 23 is a diagram showing another example of the voxel portion of the enemy character before and after the change to tilt the voxel portion of the enemy character. The example shown in FIG. 23 is an example in which a portion of the voxel portion 222 (specifically, the lower right portion) is deformed to become larger. In the example shown in FIG. 23, the center of gravity 231 moves to the right with respect to the reference axis L. Therefore, the game system 1 tilts the voxel portion 222 by rotating the voxel portion 222 in such a direction that the portion of the voxel portion 222 that is on the right side of the reference axis L comes closer to the side of the gravity direction (e.g., the lower side) and that the position on the left side, which is the opposite side, comes closer to the opposite side of the gravity direction (e.g., the upper side) (see (b) in FIG. 23).

As described above, in the present embodiment, when an event occurs, the game system 1 changes the tilt of at least a portion of the enemy character so as to rotate the enemy character about the reference position in such a direction that the portion on the side where the center of gravity of the enemy character exists after the voxel data is updated with respect to the reference axis (the left side in FIG. 22, the right side in FIG. 23) comes closer to the gravity direction side (the bottom side in FIG. 22 and FIG. 23). Thus, since the enemy character tilts toward the side to which its center of gravity has moved in response to occurrence of an event, the game system 1 can cause the enemy character to take a natural posture after the event.

In the present embodiment, the reference axis is a straight line that passes through the center of gravity of the voxel portion 222 in the reference state and is parallel to the direction of gravity in the virtual space (see FIG. 22 and FIG. 23). Thus, since the enemy character can be tilted according to the side to which the center of gravity has moved from the reference state, the tilting action of the enemy character can be made natural to the user.

Note that, in other embodiments, the reference axis is not limited to a straight line that passes through the center of gravity of the voxel portion 222 in the reference state. For example, in other embodiments, the reference axis may be any line that passes through the portion (specifically, the voxel portion 222) whose tilt is changed and is parallel to the direction of gravity in the virtual space. As will be described below, in the reference state, the reference axis does not need to pass through the reference position (e.g., it may pass through a different position than the reference position).

In the present embodiment, the reference position is the position of the pelvic joint (e.g., the joint) of the enemy character. Thus, since the enemy character tilts about the pelvic, the tilting action of the enemy character can be made natural.

In the present embodiment, when tilting the voxel portion 222, the game system 1 also tilts a portion of the non-voxel portion, as with the voxel portion 222 (see FIGS. 20 and 21), in addition to the voxel portion 222. Specifically, among the non-voxel portions 223, the game system 1 rotates non-voxel portions above the reference position (e.g., the pelvic) (specifically, non-voxel portions that are associated with the bones **225*a* to 225*g*) in accordance with the rotation of the voxel portion 222. On the other hand, non-voxel portions below the reference position (specifically, non-voxel portions that are associated with the bones 225*h* to 225*m*) are not rotated even when the voxel portion 222 is rotated. This is because if these non-voxel portions tilt, the enemy character 221 will take a posture as if it were standing at an angle to the ground, which may rather appear unnatural. Thus, when an event occurs, the game system 1 changes the tilt of the voxel portion 222 and some of the portions associated with the bone (e.g., non-voxel portions). This allows the enemy character 221** to assume a more natural posture when tilted.

Note that "above the reference position" can be said to be on the side closer to the head of the enemy character, for example. Also, "below than the reference position" can be said to be on the side closer to the feet of the enemy character (which can be said to be the part that is in contact with the ground), for example.

Note that the game system 1 tilts non-voxel portions of the non-voxel portions 223 that are tilted together with the voxel portion 222 that they rotate about the reference position, as with the voxel portion 222. Thus, the positional relationship between the voxel portion 222 and the non-voxel portion does not change before and after tilting, thereby reducing the possibility of the enemy character 221 being in an unnatural posture after tilting.

In the present embodiment, the center of gravity described above is the center of gravity of the voxel portion 222, and the game system 1 calculates the center of gravity using the voxel data (e.g., using the density of each voxel indicated by voxel data). Thus, the position of the center of gravity can be calculated by a simple calculation using voxel data. Note that, in other embodiments, the center of gravity may be calculated based on the mesh for the voxel portion 222 instead of the voxel data.

Instead of the center of gravity being calculated only for the voxel portion 222, the center of gravity may be calculated for the voxel portion 222 and a portion of the enemy character 221 other than the voxel portion 222. For example, the game system 1 may calculate the center of gravity for the voxel portion 222 and non-voxel portions that are rotated together with the voxel portion 222. For example, if the enemy object 221 is holding another object (e.g., a weapon object), the game system 1 may add the other object to the object for which the center of gravity is calculated.

In the present embodiment, the game system 1 determines the amount by which the voxel portion 222 is tilted based on the change angle of the center of gravity. The change angle of the center of gravity is the angle θ between the reference axis and the line segment extending from the center of gravity of the voxel portion 222 in the reference state to the center of gravity after deformation (see (a) in FIG. 22 and (a) in FIG. 23). The larger the change angle θ, the more the game system 1 tilts the voxel portion 222. For example, the game system 1 may multiply the change angle θ by a predetermined coefficient (e.g., a coefficient greater than 0 and less than 1), which is the angle of rotation of the voxel portion 222.

In the present embodiment, the game system 1 sets an upper limit on the angle at which the enemy character is tilted. Specifically, the game system 1 sets an upper limit value for the tilt angle of the voxel portion 222 with respect to the reference state (e.g., a state where the voxel portion 222 is not deformed), so that the tilt angle will not exceed the upper limit value. While the specific value of the upper limit value is arbitrary, it may be set to 30°, for example. If the tilt angle becomes too large, the posture of the enemy character 221 may become rather unnatural, and the actions of the enemy character 221 may become unnatural (e.g., a portion of the enemy character 221 may be buried in the ground during an action). In contrast, in the present embodiment, such a possibility can be reduced by setting the upper limit value described above.

The present embodiment has been described above with respect to an example where the reference position is located on the reference axis in the reference state (e.g., the state before deformation). Here, in other embodiments, the reference position does not need to be arranged on the reference axis in the reference state. That is, the reference state of the enemy character is not on a condition that the reference position is arranged on the reference axis. Thus, the game system 1 can make the enemy character take any tilt when the voxel portion 222 is not deformed.

Note that, in the present embodiment, the change angle of the center of gravity is calculated based on the position of the center of gravity in the reference state (e.g., it is calculated as the angle θ between the straight line extending in the up-down direction from the center of gravity in the reference state and the line segment extending from the center of gravity in the reference state to the center of gravity after deformation). In contrast, in other embodiments, the change angle of the center of gravity may be calculated with respect to the reference position. Specifically, the change angle of the center of gravity may be calculated as the angle θ' between the line segment extending from the reference position to the center of gravity in the reference state and the line segment extending from the reference position to the center of gravity after deformation of the voxel portion 222.

Note however that in the method of using the angle θ' as the change angle of the center of gravity, when the reference position is not arranged on the reference axis in the reference state, even if the center of gravity moves due to deformation of the voxel portion 222, the angle θ' may become 0 or a value close to 0 even if the center of gravity moves due to the deformation of the voxel portion 222. Then, the tilt of the enemy character may hardly change, contrary to the expectation of the user. For example, consider a case where the center of gravity of the enemy character whose center of gravity is located at the upper left of the reference position in the reference state is moved further to the upper left due to the deformation of the voxel portion 222. In this case, the user would expect the enemy character to tilt to the left because the center of gravity moves to the upper left, but since the angle θ' is 0 or a value close to 0, the tilt of the enemy character in practice may hardly change.

In contrast, in the present embodiment, the game system 1 calculates the change angle of the center of gravity based on the position of the center of gravity in the reference state, thereby reducing the possibility that the change angle of the center of gravity becomes 0 or a value close to 0 in such a case. This reduces the possibility that the tilt of the enemy character hardly changes, contrary to the expectation of the user.

As described above, in the present embodiment, the game system 1 tilts the enemy character 221 so as to lower the side that has become heavier with respect to the reference axis due to the deformation of the voxel portion 222 (e.g., the side to which the center of gravity has moved) (see FIG. 22). Now, the behavior of the enemy character 221 when the voxel portion 222 is deformed, such as changing the tilt so that the center of gravity after the deformation is located on the reference axis to achieve balance, can also be said to be a natural behavior. Therefore, in other embodiments, the direction to tilt the voxel portion 222 when the voxel portion 222 is deformed may be determined as follows.

Figure 24:
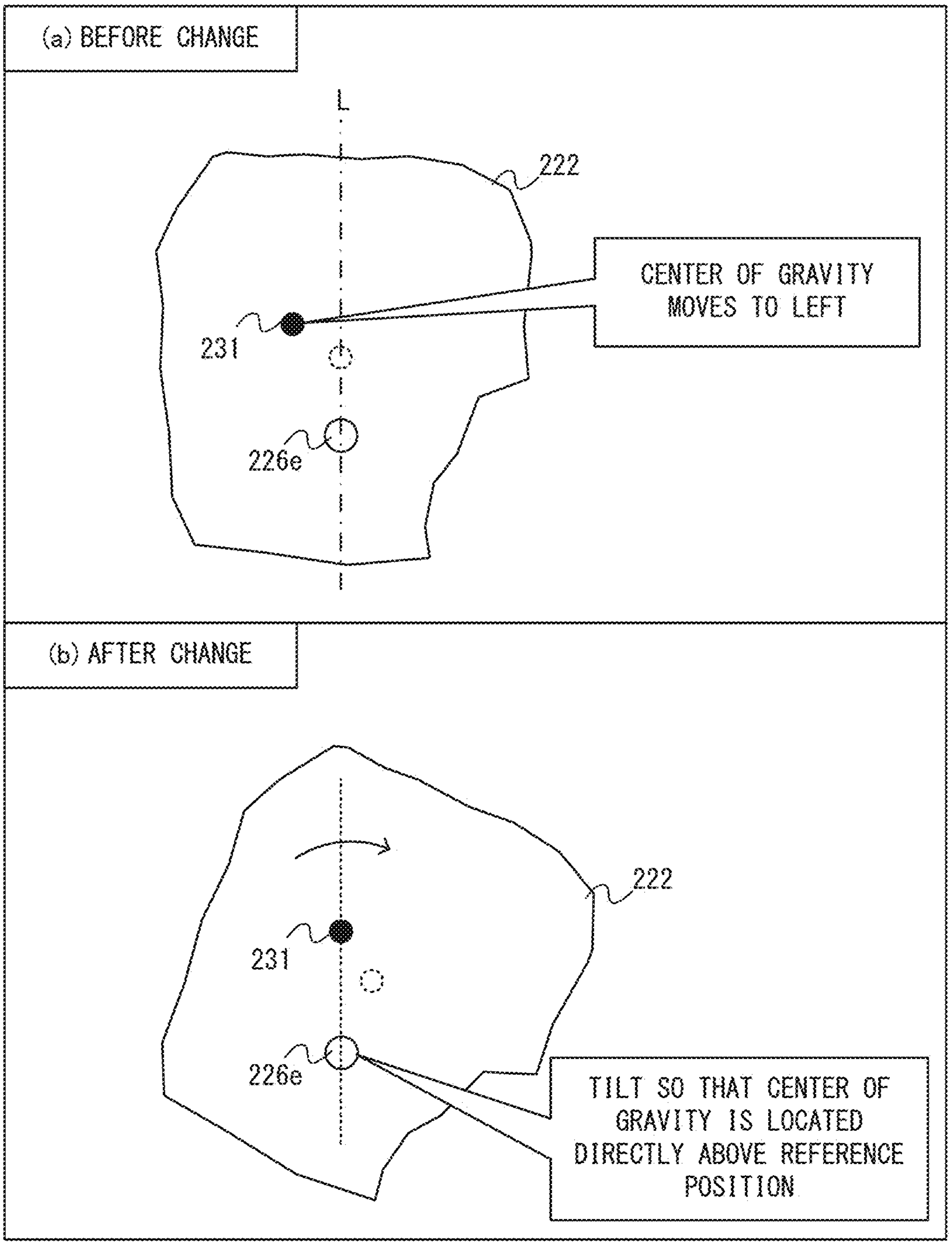
FIG. 24 is a diagram showing one example of the voxel portion of the enemy character before and after the change to tilt the voxel portion of the enemy character according to a variation of the present embodiment.

FIG. 24 is a diagram showing one example of the voxel portion of the enemy character before and after the change to tilt the voxel portion of the enemy character according to a variation of the present embodiment. Note that FIG. 24, as does FIG. 22, shows an example in which the lower right portion of the voxel portion 222 is removed.

In this variation, as in the embodiment described above, the game system 1 calculates the position of the center of gravity 231 of the voxel portion 222 after deformation. Now, in this variation, the game system 1 tilts the voxel portion 222 so that the center of gravity 231 is located on the reference axis L. Thus, in the example of FIG. 24, the voxel portion 222 rotates so that a portion of the voxel portion 222 on the side toward which the center of gravity has moved (e.g., the left side) comes closer to the opposite side of the direction of gravity (e.g., the upper side) and a portion on the right side, opposite to the side toward which the center of gravity has moved, comes closer to the side of gravity (e.g., the lower side) (see (b) in FIG. 24), thereby tilting the voxel portion 222 in the direction opposite to the embodiment described above.

Note that, in the variation described above, the game system 1 may rotate the voxel portion 222 in a direction such that the center of gravity after the deformation comes closer to the position on the reference axis L so that the center of gravity after rotation is not located on the reference axis L. That is, when an event occurs, the game system 1 may rotate the enemy character about the reference position in a direction such that the center of gravity of the enemy character after the voxel data is updated comes closer to the reference axis.

An example where the tilt of the enemy character 221 as viewed from the front (e.g., the tilt with respect to rotation about an axis parallel to the front-back direction) changes has been described above. In practice, however, the game system 1 changes the tilt when viewed from any horizontal direction (e.g., any direction perpendicular to the direction of gravity). Specifically, when the shape of the voxel portion 222 changes, the game system 1 tilts the voxel portion 222 about a rotation axis that is oriented in a direction perpendicular to the plane that includes the center of gravity after the deformation and the reference axis and that passes through the reference position. Then, the game system 1 can tilt the enemy character 221 forward, rearward, leftward and rightward, and the posture of the enemy character 221 after deformation of the voxel portion 222 can be made more natural. Note that, in other embodiments, the game system 1 may change the tilt of the enemy character only for the direction of rotation about a particular axis (e.g., about an axis parallel to the front-back direction).

2-4-3. Action Control in Tilted State

Figure 25:
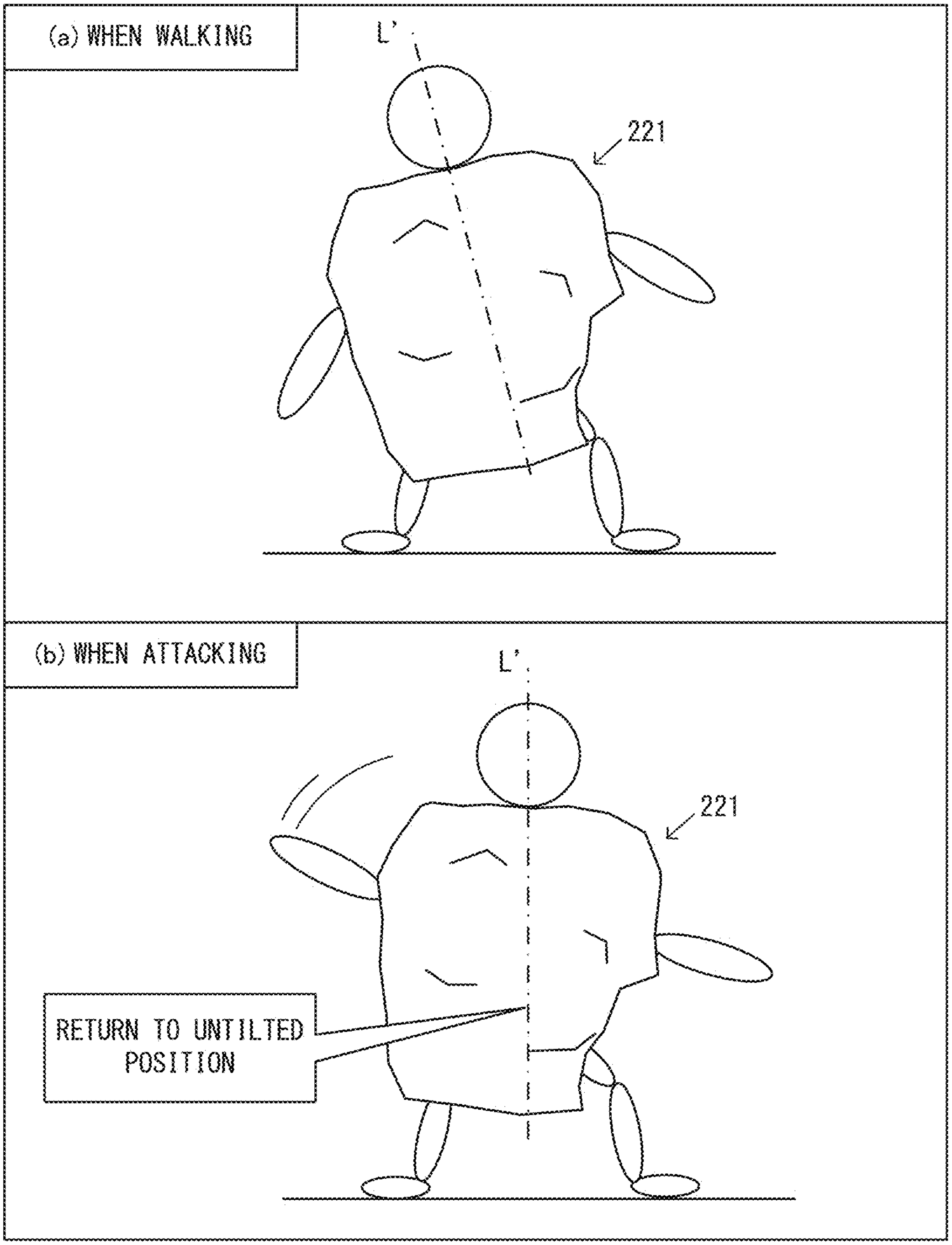
FIG. 25 is a diagram showing an example of the enemy character performing a walking action and an attacking action.

If the enemy character 221 is tilted due to the deformation of the voxel portion 222 as described above, the game system 1 causes the enemy character 221 to perform a certain action in a tilted state. FIG. 25 is a diagram showing an example of the enemy character performing a walking action and an attacking action. Note that the axis L' shown in FIG. 25 is shown for the purpose of making the tilt of the enemy character easier to understand in the figure, and is the axis that is parallel to the direction of gravity when the enemy character is in the reference state.

In the present embodiment, when having the enemy character 221 perform a walking action, the game system 1 controls the action of the enemy character 221 while it remains in a tilted state (e.g., the axis L' is in a tilted state with respect to the direction of gravity) (see (a) in FIG. 25). Thus, by keeping the enemy character 221 in a tilted state even during the walking action, it is possible to have the enemy character 221 perform the walking action more naturally.

In the present embodiment, the game system 1 has the enemy character 221 perform actions using motion data. The game system 1 stores motion data for each type of action performed by the enemy character 221. Motion data is data that specifies movements of different parts (specifically, non-voxel portions) when the character performs an action. Specifically, motion data indicates the movement of each bone (e.g., changes in the position and tilt of the bone) when the character performs an action. In the present embodiment, the motion data indicates the change from the position and tilt of each bone at the start of the action. Therefore, game system 1 can use single motion data to have the enemy character perform an action, regardless of the tilt of the enemy character in the game space.

Thus, in the present embodiment, the game system 1 controls the action of the enemy character using motion data when an event occurs, with the tilt of at least a portion of the enemy character being changed. In this case, the game system 1 has the enemy character perform an action by moving the bones according to the motion data. Thus, the enemy character can perform actions freely. Since single motion data can be used in the present embodiment regardless of whether the enemy character is in a tilted state or not, there is no need to prepare motion data for each state of the enemy character, and it is possible to reduce the amount of motion data to be prepared.

Note that in the present embodiment, the motion data indicates the walking action of the character object. That is, the game system 1 controls the action of the enemy character with the tilt of at least a part of the enemy character being changed for the walking action. Then, it is possible to have the enemy character perform a natural walking action.

In the present embodiment, when having the enemy character 221 perform an attacking action, the game system 1 controls the action of the enemy character 221 with the tilt of the enemy character 221 returned to the reference state (see (b) in FIG. 25). As for the specific action control, the game system 1 may return the tilt of the enemy character 221 to the reference state immediately before starting the attacking action and then have the enemy character 221 perform the attacking action, or it may start the attacking action and then have the enemy character 221 perform the attacking action while gradually returning the tilt of the enemy character 221 to the reference state.

Note that, as with the walking action, the attacking action is controlled by moving each bone according to the motion data. That is, when an event occurs, the game system 1 controls the action of the enemy character using the motion data with the same tilt of the enemy character as before the occurrence of the event.

Here, an attacking action is swinging an arm or wielding a weapon (not shown), for example. Therefore, if the enemy character 221 were to perform the attacking while in the tilted state, it may result in an unnatural action, e.g., the arm or weapon being buried in the ground during the action. Therefore, in the present embodiment, this possibility is reduced by returning the tilt of the enemy character 221 to the reference state for the attack action.

As described above, in the present embodiment, the game system 1 varies the tilt of the enemy character between two different types of actions performed. That is, when an event occurs, the game system 1 controls the tilt of the enemy character when the first motion data (e.g., motion data for a walking action) is used to control the action of the enemy character and the tilt of the enemy character when the second motion data (e.g., motion data for an attacking movement) is used to control the action of the enemy character so that they are different values. This reduces the possibility of an unnatural action being performed depending on the type of action.

Note that in the present embodiment, the game system 1 returns the tilt of the enemy character 221 to the reference state in the attacking action. Here, in other embodiments, instead of returning the tilt of the enemy character 221 to the reference state, the game system 1 may reduce the amount of tilt in the attacking action compared to the amount of tilt in the walking action. This can also reduce the possibility of an unnatural action being performed, as in the present embodiment.

2-4-4. Game Process

As described above, the player object can remove (or break) the voxel portion 222 by attacking the enemy character 221. Here, in the present embodiment, even if the voxel portion 222 of the enemy character 221 is broken, the enemy character 221 is not damaged directly. That is, even if the voxel portion 222 is destroyed, the hit point value of the enemy character 221 does not decrease, and even if the voxel portions 222 are all removed, the enemy character 221 is not defeated.

Note however that if the voxel portion 222 of the enemy character 221 is deformed to change the tilt of the enemy character 221 by breaking the voxel portion 222 or by bringing an attachment object into contact with the voxel portion 222, the weakness of the enemy character 221 (e.g., the core 227 set in the head or heart) may be lowered to make it easier to attack. This allows the player to progress the game advantageously. Note that in other embodiments, when the tilt of the enemy character 221 is changed, the enemy character 221 may perform the walking action by dragging a portion of the voxel portion 222, thereby slowing down the movement speed of the enemy character 221. This also allows the player to progress the game advantageously by breaking the voxel portion 222, as in the present embodiment.

In the present embodiment, the player object can damage the enemy character 221 by attacking the core 227 of the enemy character 221, and can defeat the enemy character 221. That is, when an event occurs in which the voxel portion 222 of the enemy character 221 is attacked, the game system 1 eliminates at least a part of the voxel portion 222 of the enemy character 22, and when the core 227 of the enemy character 221 is attacked, the game system eliminates the entire enemy character. Thus, in the present embodiment, the player defeats the enemy character 221 by first breaking the voxel portion 222 of the enemy character 221 to expose the core 227 and then attacking the core 227. Thus, in the present embodiment, as the enemy character 221 is configured to have the voxel portion 222 and the core 227 inside the voxel portion 222, it is possible to involve strategic aspects in attacking the enemy character 221 and to improve the playability of the game.

3. Specific Example of Processes in Game System

Next, referring to FIG. 26 to FIG. 28, specific examples of information processing in the game system 1 will be described.

Figure 26:
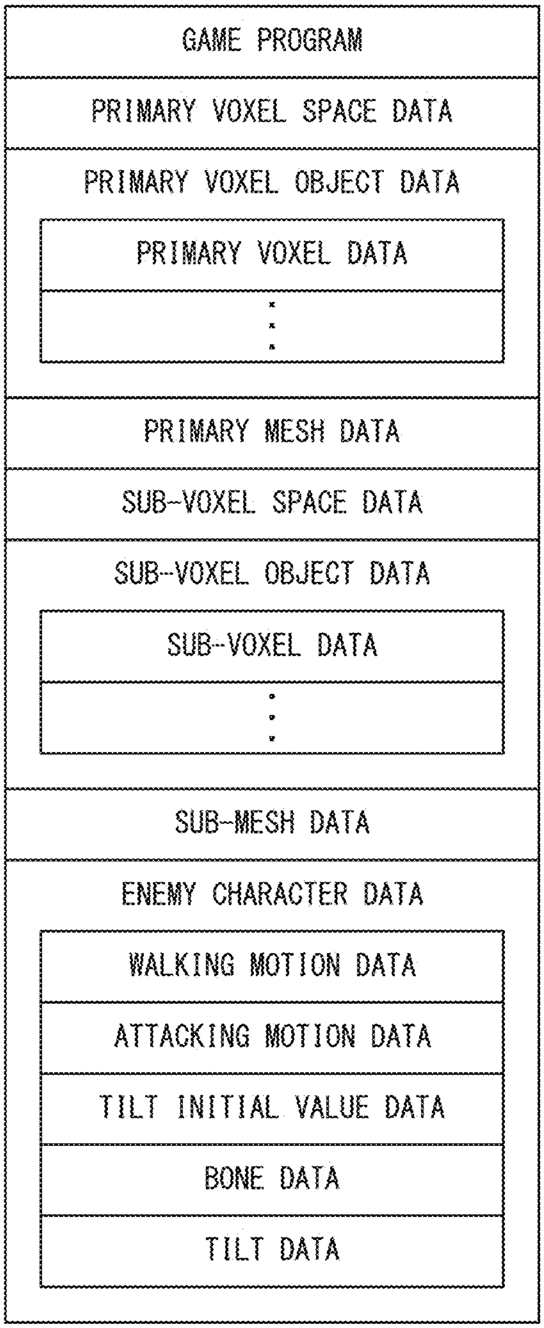
FIG. 26 is a chart showing an example of various data used for information processes in a non-limiting game system.

FIG. 26 is a chart showing an example of various data used for information processes in the game system 1. As shown in FIG. 26, the game system 1 stores a game program, primary voxel space data, primary voxel object data, primary mesh data, sub-voxel space data, sub-voxel object data, sub-mesh data and enemy character data. The game program, primary voxel space data and some of the enemy character data are data that are stored in the game system 1 in advance before the game process is executed. These data are stored, for example, in a storage medium attached to the slot 23 of the main body apparatus 2. The primary voxel object data, the primary mesh data, the sub-voxel space data, the sub-voxel object data, the sub-mesh data, and some other parts of the enemy character data are data that are generated while the game process is executed. These data are stored, for example, in the DRAM 85 of the main body apparatus 2.

Figure 27:
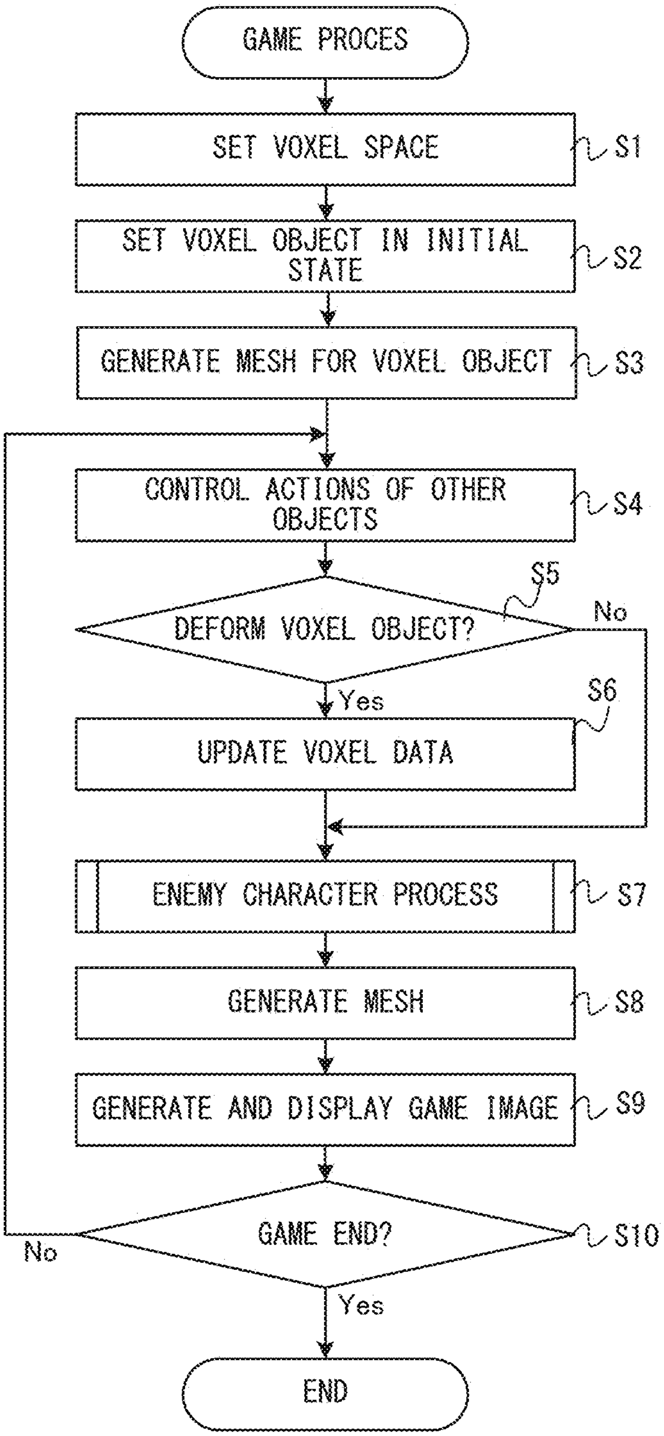
FIG. 27 is a flowchart showing an example of the flow of a game process executed by a non-limiting game system.

The game program is a game program for executing the game process in the present embodiment (specifically, the game process shown in FIG. 27).

The primary voxel space data is data that defines the primary voxel space set in the game space. Specifically, the primary voxel space data indicates the length of one side of the primary voxel and the directions of the sides of the primary voxel in the game space. When the primary voxel space is set only in a region of a part of the game space, the primary voxel space data may include data indicating the position and size of the space where the primary voxel is set (e.g., the primary voxel space) (e.g., data indicating the range in the game space where the primary voxel is set).

Primary voxel object data is data that indicates the primary object (herein, the terrain object) arranged in the game space. Specifically, the primary voxel object data includes primary voxel data for each unit area for part or whole of the range in the game space.

The primary mesh data is data that indicates the mesh set for the primary object arranged in the game space (e.g., the mesh for the terrain object). The primary mesh data includes, for example, data indicating the position of each vertex of the primary mesh.

The sub-voxel space data is data that defines the sub-voxel space set in the game space. Specifically, the sub-voxel space data indicates the position and size of the space in which the sub-voxels are set (e.g., the sub-voxel space), the length of one side of the sub-voxel, and the directions of the sides of the sub-voxel in the game space.

The sub-voxel object data is data that indicates sub-objects arranged in the game space (specifically, voxel portions of the enemy object, etc.). Specifically, the sub-voxel object data includes sub-voxel data for each unit area for part or whole of the range in the game space.

The sub-mesh data is data that indicates the mesh set for sub-objects arranged in the game space (e.g., the mesh for the voxel portions of the enemy character, etc.). The sub-mesh data includes, for example, data indicating the position of each vertex of the sub-mesh.

The enemy character data is data regarding the enemy character 221. In the present embodiment, the enemy character data includes walking motion data, attacking motion data, tilt reference value data, bone data and tilt data. The walking motion data, the attacking motion data and the tilt reference value data are data stored in advance in the game system 1 before the game process is executed. The bone data and the tilt data are data generated while the game process is executed.

The walking motion data indicates the movement of each bone in the walking action by the enemy character 221. The attacking motion data indicates the movement of each bone in the attacking action by the enemy character 221. The tilt reference value data indicates the tilt (specifically, the tilt relative to the game space) of the voxel portion 222 in the reference state. The bone data indicates the position and orientation of each bone 225 set in the enemy character 221. The tilt data indicates the current tilt of the voxel portion 222. Note that, in addition to these data described above, the enemy character data may also include data related to the joints 226 (e.g., data indicating the connection relationship between bones), data indicating the hit point value of the enemy character.

Note that, in addition to the data shown in FIG. 26, the game system 1 stores data of the property information and texture information described above, as well as data related to various characters appearing in the game, as data that is stored in the game system 1 in advance before the game process is executed.

FIG. 27 is a flowchart showing an example of the flow of the game process executed by the game system 1. The game process shown in FIG. 27 is started, for example, in response to an instruction given by the player to start the game during execution of the game program.

Note that in the present embodiment, it is assumed that the processor 81 of the main body apparatus 2 executes the processes of the steps shown in FIG. 27 by executing the game program stored in the game system 1. Note however that in other embodiments, some of the processes of the steps may be executed by another processor (e.g., a dedicated circuit) different from the processor 81. When the game system 1 can communicate with another information processing apparatus (e.g., a server), some of the processes of the steps shown in FIG. 27 may be executed on the other information processing apparatus. The processes of the steps shown in FIG. 27 are merely illustrative, and the order of steps to be performed may be switched around or other processes may be executed in addition to (or instead of) the processes of the steps, as long as similar results are obtained.

The processor 81 executes the processes of the steps shown in FIG. 27 using a memory (e.g., the DRAM 85). That is, the processor 81 stores information (in other words, data) obtained in each process step in the memory, and when the information is used in a subsequent process step, the information is read out from the memory and used.

In step S1 shown in FIG. 27, the processor 81 sets the voxel space in the game space. Specifically, the processor 81 obtains the voxel space data (specifically, the primary voxel space data and the sub-voxel space data) and stores (in other words, writes) them in the DRAM 85. Note that, in subsequent game processes, the processor 81 may refer to the voxel space data when executing processes related to voxel objects (e.g., the process in step S2). In this case, the processor 81 refers to the voxel space data stored in the DRAM 85. The process of step S2 is executed, following step S1.

In step S2, the processor 81 sets voxel objects in the reference state in the game space. Specifically, the processor 81 obtains voxel data (specifically, primary voxel data and sub-voxel data) indicating the arrangement of voxel objects in the reference state, and part or whole of the obtained voxel data is stored (in other words, written) in the DRAM 85 as voxel object data (specifically, primary voxel object data and sub-voxel object data). Note that voxel data indicating the arrangement of voxel objects in the reference state is stored, for example, in a storage medium attached to the slot 23 of the main body apparatus 2. The process of step S3 is executed, following step S2.

Note that the voxel data written to the DRAM 85 as primary voxel object data may be primary voxel data of a partial range that is used for generating the game image, of the primary voxel data of the entire range of the game space. For example, the processor 81 may use the primary voxel data only for a partial range of the game space (e.g., a range within a predetermined distance from the position of the virtual camera) to generate an object image. In this process, the primary voxel object data may include voxel data within that range. In the case where the primary voxel data is written for a partial range of the game space, a similar process to step S2 is executed at an appropriate point in time during execution of a series of steps S4 to S10 to be described below (e.g., at a point in time when the position of the virtual camera has moved a predetermined distance or more).

In step S3, the processor 81 generates meshes for objects arranged in the game space. Meshes for voxel objects are generated according to the method described in "[2-2. Mesh]" above. Here, the processor 81 generates a mesh based on the primary voxel object data and the sub-voxel object data stored in the DRAM 85, and stores them in the DRAM 85 as primary mesh data or sub-voxel data. Through the process of step S3, voxel objects have been constructed in the game space. For objects that are not voxel objects (e.g., non-voxel portions of the enemy character 221), meshes are generated based on the bones, for example. After step S3, the game is started, and a series of steps S4 to S8 are repeatedly executed in the game.

In step S4, the processor 81 controls the actions of other objects other than the enemy object 221. The "other objects" are, for example, the player object and other enemy characters (e.g., enemy characters that do not have voxel portions) other than the enemy character 221. The processor 81 controls the action of the player object based on operation data received from the controller 3 or 4, for example, and controls the actions of the other enemy objects described above based on an algorithm defined in the game program. The process of step S5 is executed, following step S4.

In step S5, the processor 81 determines whether to deform a voxel object. For example, the processor 81 determines whether an event that deforms a voxel object occurs for the voxel portion 222 of the enemy character 221 or the terrain object, which is a voxel object. If the determination result from step S5 is affirmative, the process of step S6 is executed. On the other hand, if the determination result from step S5 is negative, the process of step S7 is executed, skipping the process of step S6.

In step S6, the processor 81 updates the voxel data related to the voxel object that is determined to be deformed. Specifically, the processor 81 changes the density indicated by the voxel data so as to correspond to the shape of the voxel object after deformation. The processor 81 also updates the voxel object data stored in the DRAM 85 to indicate the changed density. The process of step S6 is executed, following step S5.

In step S7, the processor 81 executes the enemy character process to control the action of the enemy character 221. The detailed flow of the enemy character process will be described below with reference to FIG. 28.

Figure 28:
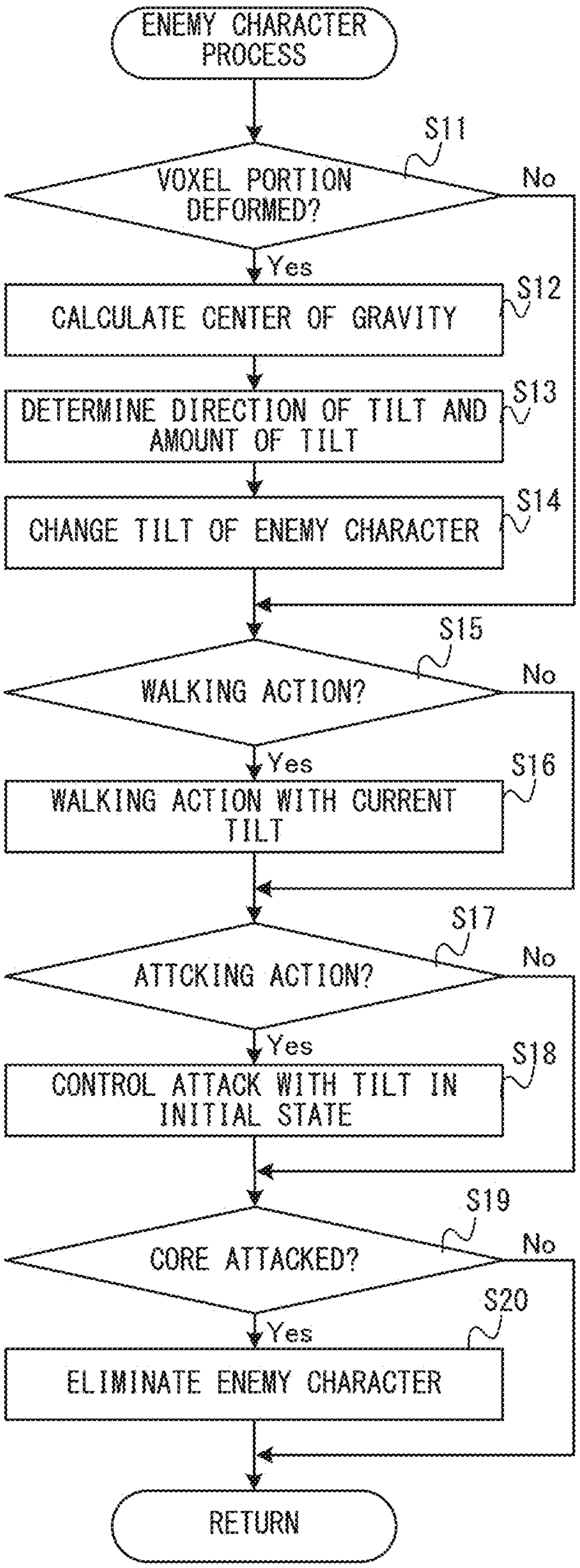
FIG. 28 is a sub-flowchart showing an example of the detailed flow of an enemy character process of step S7 shown in FIG. 27.

FIG. 28 is a sub-flowchart showing an example of the detailed flow of the enemy character process in step S7 shown in FIG. 27. In the enemy character process, first, in step S11, the processor 81 determines whether the voxel portion 222 of the enemy character 221 has been deformed. That is, the processor 81 determines whether the voxel data of the voxel portion 222 has been updated in step S6 above. If the determination result from step S11 is affirmative, the process of step S12 is executed. On the other hand, if the determination result from step S11 is negative, the process of step S15 to be described below is executed, skipping a series of processes of steps S12 to S14.

In step S12, the processor 81 calculates the center of gravity of the deformed voxel portion 222. That is, the processor 81 calculates the position of the new center of gravity according to the method described in "[2-4-2. Process of tilting enemy character]" above. The process of step S13 is executed, following step S12.

In step S13, the processor 81 determines the direction of tilt and the amount of tilt for the voxel portion 222 based on the position of the center of gravity calculated in step S12. The direction and the amount of tilt are determined according to the method described in "[2-4-2. Process of tilting enemy character]" above. The process of step S14 is executed, following step S13.

In step S14, the processor 81 changes the tilt of the enemy character 221. Specifically, the processor 81 tilts the enemy character 221 based on the direction of tilt and the amount of tilt determined in step S13. Specifically, as described in "[2-4-2. Process of tilting enemy character]" above, the voxel portion 222 and non-voxel portions that are above the reference position are tilted in the determined direction and by the determined amount. In this process, the processor 81 stores, as the tilt data, data indicating the tilt of the enemy character 221 after the change in the DRAM 85. The process of step S15 is executed, following step S14.

In step S15, the processor 81 determines whether to have the enemy character 221 perform a walking action. For example, actions to be performed by the enemy character 221 are determined based on an algorithm defined in the game program. When the conditions for having the enemy character 221 perform a walking action are satisfied in the algorithm, it is determined to have the enemy character 221 perform the walking action. If the determination result from step S15 is affirmative, the process of step S16 is executed. On the other hand, if the determination result from step S15 is negative, the process of step S17 is executed, skipping the process of step S16.

In step S16, the processor 81 has the enemy character 221 perform a walking action while maintaining the current tilt. Specifically, the processor 81 changes the position and orientation of each bone of the enemy character 221 based on the walking motion data stored in the DRAM 85 without changing the current tilt. Note that in the present embodiment, the process of step S16 is executed at a rate of once per one frame period. Therefore, in one iteration of the process of step S16, the processor 81 changes the position and orientation of each bone by the amount of change for one frame. In this process, the processor 81 updates the bone data stored in the DRAM 85 so as to indicate the position and orientation of each bone after the change.

In step S16 above, the processor 81 also changes the position and orientation of the voxel portion 222 according to the positions and orientations of the bones. For example, the position and orientation of the voxel portion 222 can be changed by changing the position and orientation of the sub-voxel space with respect to the voxel portion 222. In this process, the processor 81 updates the voxel data of the voxel portion 222 stored in the DRAM 85. The process of step S17 is executed, following step S16.

In step S17, the processor 81 determines whether or not to have the enemy character 221 perform an attacking action. For example, when the conditions for having the enemy character 221 perform an attacking action in the algorithm are satisfied, it is determined to have the enemy character 221 perform the attacking action. If the determination result from step S17 is affirmative, the process of step S18 is executed. On the other hand, if the determination result from step S17 is negative, the process of step S19 is executed, skipping the process of step S18.

In step S18, the processor 81 has the enemy character 221 perform an attacking action with the tilt of the reference state. Specifically, the processor 81 sets the tilt of the enemy character 221 to the tilt of the reference state and changes the position and orientation of each bone of the enemy character 221 based on the attacking motion data stored in the DRAM 85. Note that the tilt of the reference state can be specified by referring to the tilt reference value data stored in the DRAM 85. In step S18, as in step S16, in one iteration of the process of step S18, the processor 81 changes the position and orientation of each bone by the amount of change for one frame. The processor 81 also changes the position and orientation of the voxel portion 222 according to the positions and orientations of the bones. The processor 81 updates the bone data stored in the DRAM 85 to indicate the position and orientation of each bone after the change, and updates the voxel data stored in the DRAM 85 to indicate the position and orientation of the voxel portion 222 after the change. The process of step S19 is executed, following the process of step S18.

In step S19, the processor 81 determines whether the core 227 of the enemy character 221 has been attacked. If the determination result from step S19 is affirmative, the process of step S20 is executed. On the other hand, if the determination result from step S19 is negative, the processor 81 exits the enemy character process shown in FIG. 28.

In step S20, the processor 81 has the enemy character 221 disappear from the game space. Then, the processor 81 deletes the sub-voxel space data and the sub-voxel object data related to the enemy character 221 from the DRAM 85. After completion of the process of step S20, the processor 81 exits the enemy character process shown in FIG. 28.

Referring back to FIG. 27, the process of step S8 is executed, following the enemy character process of step S7. In step S8, the processor 81 updates the mesh for the voxel object whose voxel data has been changed in step S6 or S7 (specifically, step S16 or S18). That is, the processor 81 generates a mesh based on the changed voxel data. This allows the mesh for the voxel object to be changed dynamically in the game. Note that the processor 81 updates the mesh data (e.g., the primary mesh data and the sub-mesh data) stored in the DRAM 85 so as to indicate the newly generated mesh. The process of step S9 is executed, following step S8.

In step S9, the processor 81 generates a game image representing the game space and displays the game image on the display device. Specifically, the processor 81 generates a game image representing the game space including the voxel object and other objects (e.g., non-voxel portions of the enemy object 221). Note that the image of the voxel object is generated according to the method described in "[2-2. Mesh]" above using the voxel object data and the mesh data stored in the DRAM 85. The processor 81 displays the generated game image on the display device. Note that during the game, the process of step S9 is executed repeatedly at a rate of once per a predetermined amount of time (e.g., one frame period). The process of step S10 is executed, following step S9.

In step S10, the processor 81 determines whether or not to end the game. For example, the processor 81 determines whether an instruction to end the game has been given by the user. If the determination result from step S10 is negative, the process of step S4 is executed again. Thereafter, a series of processes of steps S4 to S10 are executed repeatedly until it is determined in step S10 to end the game. On the other hand, if the determination result from step S10 is affirmative, the processor 81 ends the game process shown in FIG. 27.

4. Functions/Effects and Variations of Present Embodiment

As described above, in the embodiment described above, the information processing system (specifically, the game system 1) is configured to have the following units:

- a mesh generator (steps S3 and S8) configured to generate a mesh for a character object (e.g., the enemy character 221) in a virtual space based on voxel data related to the character object;
- a motion controller (steps S16 and S18) configured to control an action of the character object using first motion data (e.g., walking motion data);
- a voxel data updater (step S6) configured to update the voxel data related to the character object when an event (e.g., an event that deforms the voxel portion 222) occurs for the character object; and an image generator (step S9) configured to generate an image of the virtual space including an image in which the mesh for the character object is rendered so as to output the generated image to a display device.

In the configuration above, when the voxel data is updated, the mesh generator generates the mesh for the character object based on the updated voxel data (Step S8). When the event occurs, the motion controller controls an action of the character object using the first motion data with the tilt of at least a portion of the character object (e.g., the voxel portion 222 and some of the non-voxel portions 223) with respect to the virtual space being changed (step S16).

With the configuration above, as the action of the character object is controlled with the tilt of the character object changed when the voxel data is updated, it is possible to have the character object perform natural actions. By using the same motion data for when the tilt is changed and when the tilt is not changed, it is possible to reduce the amount of data of the motion data. Thus, according to the embodiment described above, it is possible to have an object perform natural actions with less motion data.

In the embodiment described above, when voxel data is updated, the information processing system calculates the center of gravity for a portion of the character object that includes at least a portion that is generated by voxel data based on the updated voxel data (step S12). Then, the information processing system determines the direction in which the tilt of at least a portion of the character object is changed based on the change in the center of gravity before and after the occurrence of the event (step S13, FIG. 22 and FIG. 24). Thus, by calculating the center of gravity based on voxel data, it is possible to reduce the processing load for calculation. By determining the direction of tilt based on the center of gravity, it is possible to have an object perform natural actions.

Note that "the center of gravity for a portion of the character object that includes at least a portion that is generated by voxel data" refers to the center of gravity calculated for the portion of the character object that includes said portion. That is, the center of gravity may be the center of gravity for said portion, the center of gravity for said portion and a portion whose tilt changes together with said portion (e.g., a portion of the non-voxel portion 223), or the center of gravity for the entire character object.

Variation Regarding Character Object

In the embodiment described above, the case of controlling the action of the enemy object has been described above as an example of the character object. Here, the type and the appearance of the character object are arbitrary and are not limited to the enemy object. For example, the information processing system may perform the tilt control and the action control according to the embodiment described above for the player object controlled by the player. Although the enemy object is a character object that walks on two legs, for example, the information processing system may perform the tilt control and the action control according to the embodiment described above for a character object that walks on four legs, or a character object that flies in the air. Note that, for a character object that walks on four legs, the information processing system may change the tilt of the character object only in the direction of rotation about an axis parallel to the front-back direction, while not changing the tilt of the character object in the direction of rotation about an axis parallel to the left-right direction. For a character object that flies in the air, the information processing system may have the character object flap its wings with the tilt is changed.

Note that in other embodiments, the information processing system does not need to include one or more of the components of the embodiment described above and does not need to execute one or more of the processes that are executed in the embodiment described above. For example, in order to realize a specific one of the advantageous effects of the embodiment described above, the information processing system may include a component or components for realizing the specific advantageous effect and execute a process or processes for realizing the specific advantageous effect, and the game system does not need to include other components and does not need to execute other processes.

The embodiment described above can be used as, for example, a game system and a game program, with the aim of, having an object perform a natural action using less motion data, for example.

While certain example systems, methods, devices and apparatuses have been described herein, it is to be understood that the appended claims are not to be limited to the systems, methods, devices and apparatuses disclosed, but on the contrary, are intended to cover various modifications and equivalent arrangements included within the spirit and scope of the appended claims.

What is claimed is:

1. One or more non-transitory computer-readable storage medium having stored therein instructions that, when executed, cause one or more processors of an information processing apparatus to execute information processing comprising:

generating a mesh for a character object in a virtual space based on voxel data related to the character object;

controlling an action of the character object using first motion data;

updating the voxel data related to the character object when an event occurs for the character object; and generating an image of the virtual space including an image in which the mesh for the character object is rendered so as to output the generated image to a display device, wherein:

when the voxel data is updated, the mesh for the character object is generated based on the updated voxel data; and when the event occurs, an action of the character object is controlled using the first motion data with a tilt of at least a portion of the character object with respect to the virtual space being changed.

2. The non-transitory computer-readable storage medium according to claim 1, wherein the information processing further comprises:

when the voxel data is updated, calculating, based on the updated voxel data, the center of gravity for a portion of the character object, the portion at least including a portion generated by the voxel data, wherein a direction in which the tilt of the at least a portion of the character object is changed is determined based on change in the center of gravity before and after the occurrence of the event.

3. The non-transitory computer-readable storage medium according to claim 2, wherein where a reference axis is defined as a straight line that passes through the at least a portion of the character object and is parallel to a gravity direction in the virtual space, when the event occurs, the tilt of the character object changes so as to rotate the at least a portion of the character object about a reference position, which is set in the character object, in such a direction that a portion on a side where the center of gravity for the character object exists after the voxel data is updated with respect to the reference axis comes closer to a gravity direction side.

4. The non-transitory computer-readable storage medium according to claim 2, wherein where a reference axis is defined as a straight line that passes through the at least a portion of the character object and is parallel to a gravity direction in the virtual space, when the event occurs, the tilt of the character object changes so as to rotate the at least a portion of the character object about a reference position, which is set in the character object, in such a direction that the center of gravity for the character object after the voxel data is updated comes closer to the reference axis.

5. The non-transitory computer-readable storage medium according to claim 3, wherein the reference axis is a straight line that passes through a position different from the reference position and is parallel to a gravity direction in the virtual space.

6. The non-transitory computer-readable storage medium according to claim 3, wherein the reference axis is a straight line that passes through the center of gravity for the character object before the voxel data is updated and is parallel to the gravity direction in the virtual space.

7. The non-transitory computer-readable storage medium according to claim 3, wherein:

the character object includes a portion that is associated with a bone that is set in the character object; and an action by the character object is performed by moving the bone according to the first motion data.

8. The non-transitory computer-readable storage medium according to claim 7, wherein:

the character object includes a first portion whose shape is defined based on the voxel data, and a second portion that is different from the first portion and is associated with the bone, and when the event occurs, a tilt of the first portion and a portion of the second portion changes as the at least a portion of the character object.

9. The non-transitory computer-readable storage medium according to claim 7, wherein the reference position is a position of a pelvic joint of the character object among all joints that connect together bones.

10. The non-transitory computer-readable storage medium according to claim 1, wherein the first motion data represents a walking action of the character object.

11. The non-transitory computer-readable storage medium according to claim 1, wherein an upper limit is set for an angle by which the character object is tilted.

12. The non-transitory computer-readable storage medium according to claim 1, wherein when the event occurs, the voxel data is updated so as to reduce a volume of the character object.

13. The non-transitory computer-readable storage medium according to claim 1, wherein when the event occurs, the voxel data is updated so as to increase a volume of the character object.

14. The non-transitory computer-readable storage medium according to claim 1, wherein:

an action of the character object is further controlled using second motion data, which is different from the first motion data; and when the event occurs, the tilt of the character object when controlling an action of the character object using the first motion data is different from the tilt of the character object when controlling an action of the character object using the second motion data.

15. The non-transitory computer-readable storage medium according to claim 14, wherein when the event occurs, an action of the character object is controlled using the second motion data wherein the tilt of the character object is set to the same tilt as that before the occurrence of the event.

16. The non-transitory computer-readable storage medium according to claim 1, wherein:

the character object is an enemy character object and includes a core inside a voxel object portion whose shape is defined based on the voxel data;

the event is an event in which the enemy character object is attacked; and the information processing further comprises, when the core is attacked, eliminating entirety of the enemy character object.

17. An information processing system, comprising one or more processors that are configured to execute information processing comprising:

generating a mesh for a character object in a virtual space based on voxel data related to the character object;

controlling an action of the character object using first motion data;

updating the voxel data related to the character object when an event occurs for the character object; and generating an image of the virtual space including an image in which the mesh for the character object is rendered so as to output the generated image to a display device, wherein:

when the voxel data is updated, the mesh for the character object is generated based on the updated voxel data; and when the event occurs, an action of the character object is controlled using the first motion data with a tilt of at least a portion of the character object with respect to the virtual space being changed.

18. An information processing apparatus comprising one or more processors that execute information processing, the information processing comprising:

generating a mesh for a character object in a virtual space based on voxel data related to the character object;

controlling an action of the character object using first motion data;

updating the voxel data related to the character object when an event occurs for the character object; and generating an image of the virtual space including an image in which the mesh for the character object is rendered so as to output the generated image to a display device, wherein:

when the voxel data is updated, the mesh for the character object is generated based on the updated voxel data; and when the event occurs, an action of the character object is controlled using the first motion data with a tilt of at least a portion of the character object with respect to the virtual space being changed.

19. An information processing method performed on an information processing system, the information processing method comprising:

generating a mesh for a character object in a virtual space based on voxel data related to the character object;

controlling an action of the character object using first motion data;

updating the voxel data related to the character object when an event occurs for the character object; and generating an image of the virtual space including an image in which the mesh for the character object is rendered so as to output the generated image to a display device, wherein:

when the voxel data is updated, the mesh for the character object is generated based on the updated voxel data; and when the event occurs, an action of the character object is controlled using the first motion data with a tilt of at least a portion of the character object with respect to the virtual space being changed.

* * * * *